(12) United States Patent
Chafkin et al.

(10) Patent No.: US 8,335,735 B1
(45) Date of Patent: Dec. 18, 2012

(54) COMPUTER IMPLEMENTED RISK MANAGED INDICES

(75) Inventors: Jeremiah H. Chafkin, Chestnut Hill, MA (US); Andrew W. Lo, Weston, MA (US); Robert W. Sinnott, Boston, MA (US)

(73) Assignee: Alphasimplex Group, LLC, Cambridge, MA (US)

( * ) Notice: Subject to any disclaimer, the term of this patent is extended or adjusted under 35 U.S.C. 154(b) by 0 days.

(21) Appl. No.: 13/208,421

(22) Filed: Aug. 12, 2011

(51) Int. Cl.
  *G06Q 40/00* (2006.01)
(52) U.S. Cl. .................................................. 705/36 R
(58) Field of Classification Search .................. 705/36 R
  See application file for complete search history.

(56) References Cited

U.S. PATENT DOCUMENTS

| | | | |
|---|---|---|---|
| 2005/0080704 A1* | 4/2005 | Erlach et al. | 705/36 |
| 2010/0131425 A1* | 5/2010 | Stolerman et al. | 705/36 R |
| 2010/0287113 A1* | 11/2010 | Lo et al. | 705/36 R |

* cited by examiner

*Primary Examiner* — Lindsay M. Maguire
(74) *Attorney, Agent, or Firm* — Troutman Sanders LLP

(57) ABSTRACT

Computer based systems and program controlled methods reduce investors' exposure to the variability of an asset class's short-term volatility using rules-based long-only investments in various asset classes in which portfolio weights are dynamically rebalanced on a regular basis to a desired target volatility. This is achieved, in part, by constructing an index that represents a portfolio of liquid futures contracts, rebalanced as often as daily with the objective of maintaining the portfolio's volatility at a given level, typically the long-term average risk of that asset class.

13 Claims, 15 Drawing Sheets

US 8,335,735 B1

COMPUTER IMPLEMENTED RISK MANAGED INDICES

FIELD OF THE INVENTION

The present invention is directed to novel financial management systems and technologies. In particular, the present invention is directed to a computer implemented price volatility management system for selected assets and asset classes.

The present invention also represents a further refinement of and exposition to U.S. patent application Ser. No. 12/387,898, filed on May 8, 2009, and the entire content thereof is hereby incorporated into this application by reference. In addition, the present invention shares attributes with co-pending patent application titled: "Computer Implemented Risk Managed Trend Indices" filed concurrently herewith to the same inventors, the contents of this application is also incorporated by reference.

BACKGROUND OF THE INVENTION

The risk/reward trade-off across financial assets is a well-established empirical fact in the finance literature: over the long term, riskier assets yield higher expected returns. Even with the 2008 market decline, the difference between the geometric average annual return of U.S. large-cap stocks and U.S. Treasury bills from January 1926 to December 2009 is 8.1% (see Table 1). While the articulation of this risk/reward relationship has been refined to specify the type of risk for which investors are compensated as systematic risk, the principle remains the same, i.e., investors require higher expected return to accept incremental undiversifiable risk.

This powerful idea has had far-reaching consequences both in academia and in practice. It provides the motivation for the doctrine of passive investing. If assets with non-diversifiable risk carry a positive risk premium, that premium may be captured in a low-cost, transparent, and scalable fashion by constructing a well-diversified portfolio of risky assets.

TABLE 1

Summary statistics of Ibbotson's *Stocks, Bonds, Bills, and Inflation* series from January 1926 to December 2009. Source: Ibbotson (2010, Table 2-1).
Long-Term Risk Premia of Various Asset Classes

| Asset Class | Arithmetic Mean | Geometric Mean | Standard Deviation |
|---|---|---|---|
| Large Company Stocks | 9.8% | 11.8% | 20.5% |
| Small Company Stocks | 11.9% | 16.6% | 32.8% |
| Long-Term Corporate Bonds | 5.9% | 6.2% | 8.3% |
| Long-Term Government Bonds | 5.4% | 5.8% | 9.6% |
| Intermediate-Term Government Bonds | 5.3% | 5.5% | 5.7% |
| U.S. Treasury Bills | 3.7% | 3.7% | 3.1% |
| Inflation | 3.0% | 3.1% | 4.2% |

However, history has shown that this risk premium is not earned smoothly over time because of fluctuating levels of return and volatility. Investors who desire some stability in the risks they agree to take on do not expect the volatility of a "conservative" portfolio of 30% stocks and 70% bonds to exhibit annualized volatility levels of 25%,[1] yet this is exactly what such a portfolio yielded in 2008 when the Chicago Board Options Exchange Market Volatility Index (VIX) reached 81% in November (see FIG. 1). Of course, this would not necessarily be cause for concern if periods of elevated volatility provided investors with commensurately high average returns, since passive buy-and-hold portfolios would be compensated for volatility spikes. But there is mounting evidence that periods of higher volatility are not usually associated with periods of higher expected return (see the discussion in Section 3), in which case even passive long-term investments may be disadvantaged by periods of extreme volatility.

[1] Calculated using a 30-day rolling average volatility estimate of a 30% S&P 500 Index/70% BarCap Aggregate Bond Index Portfolio. Values shown occurred on November 20$^{th}$, 2008.

One mechanism that may contribute to a short-term reversal of the historical risk/reward relationship is a "flight-to-safety" reaction by investors in which leveraged bets are unwound and assets are moved en masse from risky to riskless securities in a relatively short period of time. During such episodes, the sustained process of exiting risky positions will, by definition, put downward pressure on the prices of those assets, causing them to earn lower or negative returns. The reverse will occur for safer assets in which investors are seeking refuge, and the combined effect is to temporarily reduce or, in extreme cases, flip the sign of historically positive risk premia.

This dynamic suggests that the standard risk/reward trade-off to which investors have become accustomed is not constant over time, but is punctuated by periods in which holding risky assets is not rewarded (see, for example, Miller, 2009). FIG. 2 illustrates this pattern empirically, showing that the average annualized returns for periods of high volatility are not commensurately higher than those for periods of average volatility. In fact, they have been lower on average.

OBJECTS AND SUMMARY OF THE PRESENT INVENTION

It is an object of the present invention to provide a selectively engineered asset-based index for use to support risk managed investments.

It is a further object of the present invention to provide a system to calculate investment returns for plural accounts in accordance with a computer controlled investment management system, based on the risk controlled index.

The foregoing and other features of the present invention are further presented in conjunction with the following diagrams depicting a specific illustrative embodiment of the present invention of which:

DESCRIPTION OF THE INVENTION AND ILLUSTRATIVE EMBODIMENTS THEREOF

Figure 1:
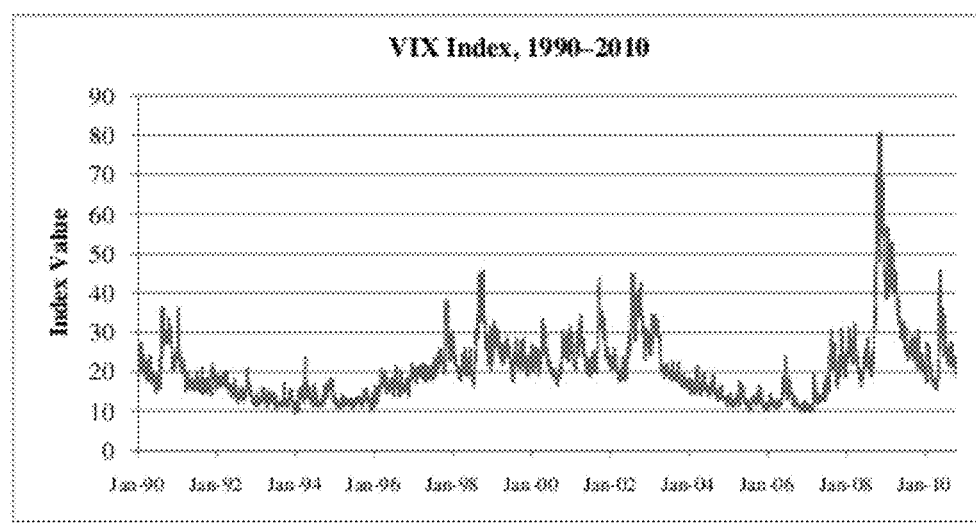
FIG. 1 is a monthly VIX volatility index from January 1990 to September 2010.
Figure 2:
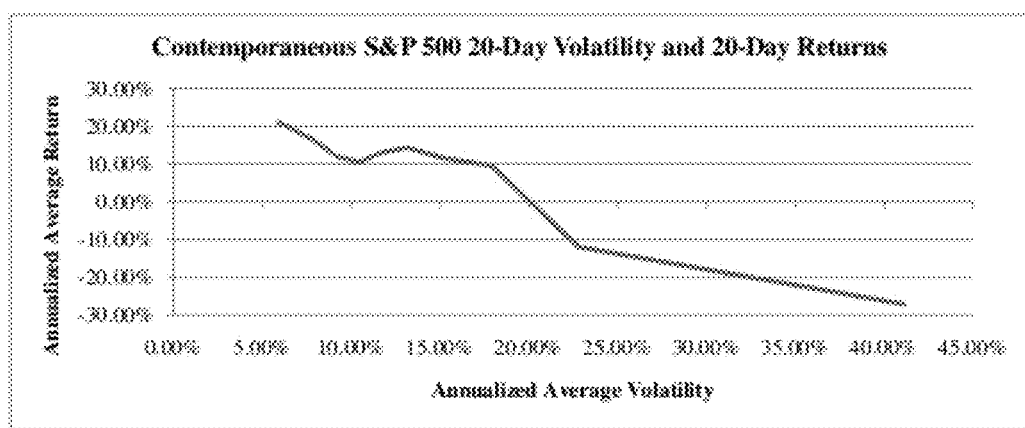
FIG. 2 is a chart reflecting 20-day average returns are sorted into deciles 1 (lowest) to 10 (highest), based on the contemporaneous 20-day rolling volatility estimate of the S&P 500 Index. Averages are calculated arithmetically, and annualized using a 252-day year.
Figure 3:
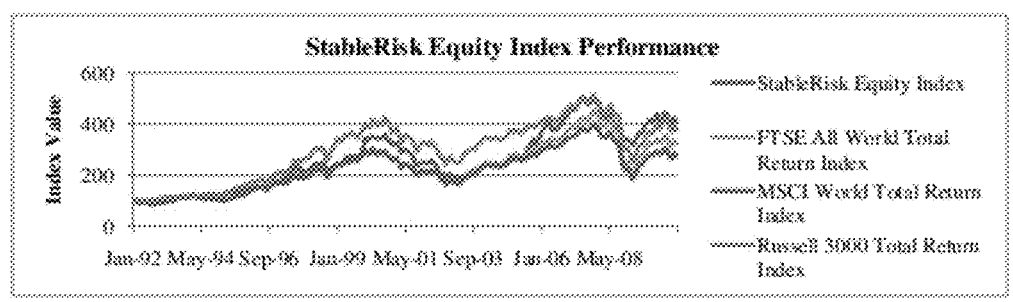
FIG. 3 is the cumulative returns of the StableRisk Equity Index compared to traditional equity asset class benchmarks, over the period from 1992 to August 2010.
Figure 4:
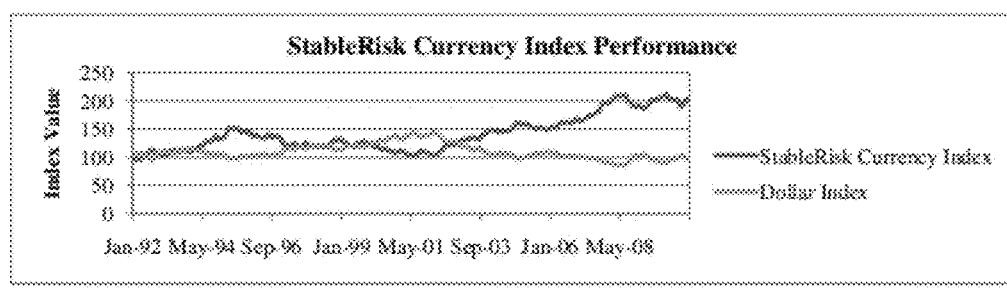
FIG. 4 is the cumulative returns of the StableRisk Currency Index compared to the U.S. Dollar Index over the period from 1992 to August 2010.
Figure 5:
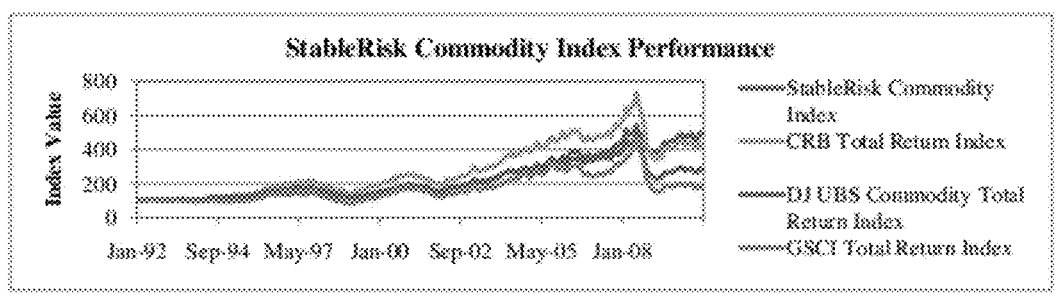
FIG. 5 is the cumulative returns of the StableRisk Commodity Index compared to traditional commodity asset class benchmarks, over the period from 1992 to August 2010.
Figure 6:
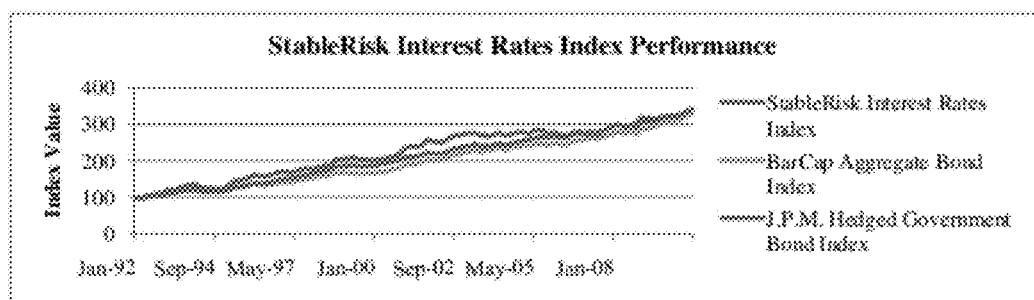
FIG. 6 is the cumulative returns of the StableRisk Interest Rates Index compared to traditional bond and interest rate asset class benchmarks, over the period from 1992 to August 2010.
Figure 7:
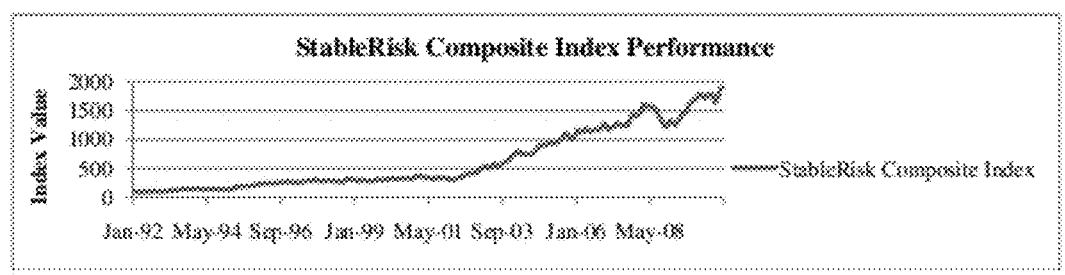
FIG. 7 is the cumulative returns of the StableRisk Composite Index over the period from 1992 to August 2010.

The FTSE StableRisk Indices track rules-based long-only investments in various asset classes in which the portfolio weights are dynamically rebalanced on a daily basis to a desired target volatility, with the goal of allowing investors to capture long-term expected-return premia with less extreme shifts in short-term risk levels. The StableRisk risk control mechanism yields more consistent risk exposures than traditional market-capitalization-weighted portfolios in which risk levels are allowed to drift freely with the market's volatility. The StableRisk concept is highly flexible and can be applied to individual markets, a variety of market tilts, and to rules-based portfolios such as long/short trend-following strategies. An example is provided in the co-pending application to the present inventors described and incorporated by reference above. The illustrative set of FTSE StableRisk Indices provides exposure to each of four broad asset classes at a targeted level of volatility in a long-only framework covering, in aggregate, sixty-nine distinct global markets.

The FTSE StableRisk Indices provide exposure to an asset class in a long-only framework, but seek to reduce investors' exposure to the variability in the asset class's short-term volatility. This is achieved by constructing an index that represents a portfolio of liquid futures contracts, rebalanced as often as daily with the objective of maintaining the portfolio's volatility at a given level, typically the long-term average risk of that asset class. The index therefore is expected to exhibit relatively stable risk at all times when compared to the asset class's risk levels including during periods of high market volatility. In essence, the FTSE StableRisk Indices aim to mitigate a source of risk for which investors may not be rewarded.

The FTSE StableRisk Indices discussed infra cover four asset classes: equities, commodities, interest rates, and currencies. Within each asset class, futures contracts are used to represent a market or an asset, and a separate FTSE StableRisk Index is constructed for each asset class. The FTSE StableRisk Composite Index, representing all assets and asset classes, is also computed. The specific futures contracts used to construct the indices are selected on the basis of their liquidity; only the most liquid contracts are employed so as to ensure that the indices are truly investable in large size. This liquidity threshold implies that the number of contracts represented in the indices may change over time. In one embodiment, sixty-nine assets are used to construct the indices as of 2010 (see Table B.1 in the Appendix for the specific contracts and their tickers):

Equities: twenty-one global market index futures contracts.

Commodities: twenty futures contracts consisting of two precious metal, four base metal, six energy, one livestock, and seven agricultural commodities futures contracts.

Currencies: six currency futures contracts.

Interest Rates: twenty-two futures contracts consisting of twelve global bond and ten global interest rate futures contracts.

Composite Index: all sixty-nine assets included in the four asset classes above.

The basic objective of the StableRisk indices is to provide exposure to one or more asset classes (or assets) with short-term risk that is, at all times, at or near the long-term volatility level of those asset classes. This is expected to be achieved through the following process:

1. The eligible futures contracts are identified based on a minimum average daily dollar trading volume and regulatory restrictions.

2. The volatility target for each index is calculated annually using the trailing 10-year average volatility for a traditional long-only index representing that asset class. The FTSE StableRisk Indices' volatility is targeted at the long-term average volatility exhibited by the industry standard benchmarks listed in Table 2. The short-term volatility of each index is stabilized at the target level described above by modulating the market exposure of each index. For example, if short-term market volatility were to double, the market exposure of the StableRisk index would be halved.

TABLE 2

The traditional long-only indices on which the FTSE StableRisk Indices' long-term average volatility benchmarks are based, along with their historical volatilities from January 2000 to December 2009.
Long-Term Volatility Benchmarks of StableRisk Indices

| FTSE StableRisk Index | Long-Term Volatility Benchmark | Average Volatility of Benchmark from January 2000 to December 2009 |
|---|---|---|
| Equity Index | FTSE All World Equity Index | 14.7% |
| Interest Rates Index | J.P. Morgan Hedged Global Government Bond Index | 3.1% |
| Commodity Index | CRB—Reuters Jefferies Commodity Index | 14.8% |
| Currency Index | Dollar Index | 7.9% |
| Composite Index | Fixed 15% Annualized Volatility | 15.0% |

3. The risk allocation among constituent assets is determined using a rules-based, systematic, top-down approach. Within each asset class, risk is allocated equally among countries (if relevant), and within each country, risk is allocated equally among all constituent contracts. For asset classes such as commodities, where countries are not relevant, risk is allocated equally among all constituent assets.

4. For the FTSE StableRisk Composite Index, the short-term volatility of each asset class is used to rescale the risk allocation among the asset classes (stocks, commodities, currencies, and interest rates) in a process identical to Step 3, and the asset classes are then combined, using these risk allocations, into the Composite index. This process ensures the Composite index is maintained at or near its targeted volatility level at all times and that its risk is allocated equally across all asset classes, countries, and constituent contracts.

5. Because these indices involve more frequent rebalancing than traditional long-only buy-and-hold indices, trading costs are deducted when computing index returns (see Tables B.3 and B.4 in the Example, infra, for the assumed trading costs applied to each contract used in the indices).

Tables 3-7 and FIGS. 3-7 summarize the historical performance of the StableRisk Indices for the period from January 1992 to August 2010. The average returns, volatilities, maximum drawdowns, and Sharpe ratios of the FTSE StableRisk Indices are considered, along with a relevant traditional long-only benchmark for each asset class. The historical correlation of the StableRisk Indices with the traditional long-only benchmarks is shown at the end of the section in Table 8.

Over the sample period, the historical performance of the FTSE StableRisk Indices compares favorably in terms of absolute and risk-adjusted returns for most asset classes, and in most cases has also experienced less extreme maximum drawdowns.

TABLE 3

Comparison of the StableRisk Equity Index and the FTSE All World Equity Index performance over the period from 1992 through August 2010.
StableRisk Equity Index Comparison

| January 1992-August 2010 | StableRisk Equity Index | FTSE All World Equity Index* |
|---|---|---|
| Mean Return | 7.8% | 6.5% |
| Standard Deviation | 16.3% | 15.4% |

TABLE 3-continued

Comparison of the StableRisk Equity Index and the FTSE All World Equity Index performance over the period from 1992 through August 2010.
StableRisk Equity Index Comparison

| January 1992-August 2010 | StableRisk Equity Index | FTSE All World Equity Index* |
|---|---|---|
| Sharpe Ratio[§] | 0.26 | 0.19 |
| Max. Drawdown | −49.0% | −54.5% |

*The FTSE All World Equity Index is proxied prior to 1994 by the MSCI World Index.
[§]Sharpe Ratio is calculated using the 3-month T-bill yield as the riskless rate of return.

The FTSE StableRisk Equity Index over the sample period enjoyed a higher average return than the FTSE All World Equity Index on both an absolute and risk-adjusted basis. Its mean annual return of 7.8% is 130 basis points greater than the FTSE All World Index's 6.5%, with volatility that is only 0.8% higher (within expectations given the inevitable differences between ex ante volatility estimates and realized volatilities). In addition, its maximum drawdown during the sample period was 5.5% better. Not surprisingly, the FTSE StableRisk Equity Index exhibits similar relative performance versus other broad equity indices such as the MSCI World Index and the Russell 3000 index, as shown in Table 8, since the correlations of these benchmarks with the FTSE All World Index are 99.8% and 84.8% respectively.

TABLE 4

Comparison of the StableRisk Commodity Index and the Reuters Jefferies CRB Index performance over the period from 1992 through August 2010.
StableRisk Commodity Index Comparison

| January 1992-August 2010 | StableRisk Commodity Index | Reuters Jeffries CRB Index |
|---|---|---|
| Mean Return | 8.9% | 8.0% |
| Standard Deviation | 13.0% | 15.5% |
| Sharpe Ratio[§] | 0.41 | 0.29 |
| Max. Drawdown | −29.6% | −54.0% |

[§]Sharpe Ratio is calculated using the 3-month T-bill yield as the riskless rate of return.

The FTSE StableRisk Commodity Index also generated higher absolute and risk-adjusted returns than those of the CRB Index over the sample period, outperforming the CRB Index's 8.0% annual return by 0.9%, while having a standard deviation 2.5% less than the CRB's. It achieved this with a maximum drawdown that was 24.3% better than that of the volatile CRB Index. With a correlation to the GSCI of 83.1%, and a correlation to the Dow Jones/UBS Commodity Index of 87.6%, the StableRisk Commodity Index tracks a commodity portfolio that fits the same factor niche as these traditional commodity indices, but with substantially less downside risk, on a historical basis.

TABLE 5

Comparison of the StableRisk Currency Index and the U.S. Dollar Index performance over the period from 1992 through August 2010.
StableRisk Currency Index Comparison

| January 1992-August 2010 | StableRisk Currency Index | Dollar Index |
|---|---|---|
| Mean Return | 3.8% | 0.0% |
| Standard Deviation | 9.2% | 8.3% |
| Sharpe Ratio[§] | 0.03 | −0.43 |
| Max. Drawdown | −32.5% | −40.3% |

[§]Sharpe Ratio is calculated using the 3-month T-bill yield as the riskless rate of return.

The FTSE StableRisk Currency Index exhibited absolute and risk-adjusted returns that were materially better than the U.S. Dollar Index during the sample period, returning a positive 3.8% annualized return, as compared to the U.S. Dollar Index which was flat. While the StableRisk Currency Index does have a slightly higher standard deviation than the Dollar Index, its maximum drawdown was 7.8% better. The correlation between the FTSE StableRisk Currency Index and the U.S. Dollar Index is −91.5% over the historical period. The negative correlation between the two indices results from one being long and the other being short a basket of non-U.S. currencies (the decision to be long a basket of non-U.S. currencies is based on the fact that historically it is this investment that has earned a risk premium). The absolute magnitude of the correlation reflects the fact that the same factors are driving both indices.

TABLE 6

Comparison of the StableRisk Interest Rates Index and the J.P. Morgan Hedged Government Bond Index performance over the period from 1992 through August 2010.
StableRisk Interest Rates Index Comparison

| January 1992-<br>August 2010 | StableRisk<br>Interest Rates<br>Index | J.P. Morgan Hedged<br>Government Bond Index* |
|---|---|---|
| Mean Return | 6.7% | 6.8% |
| Standard Deviation | 5.6% | 3.3% |
| Sharpe Ratio§ | 0.57 | 1.02 |
| Max. Drawdown | −10.2% | −5.3% |

*The J.P. Morgan Bond Index is proxied prior to 1993 by the BarCap Aggregate Bond Index.
§Sharpe Ratio is calculated using the 3-month T-bill yield as the riskless rate of return.

The FTSE StableRisk Interest Rates Index is the only StableRisk Index which does not outperform its corresponding traditional long-only benchmark over the sample period. While the absolute returns are roughly comparable at 6.7% versus 6.8% for the J.P. Morgan Hedged Government Bond Index, the risk adjusted returns underperform, with a Sharpe ratio of 0.57 that is roughly half that of the 1.02 Sharpe ratio of the J.P. Morgan Bond Index. We conjecture that the reason for this outlier is the lack of comparability with traditional government bond indices, which benefit from the proportionately larger coupon income from longer-dated bonds; in contrast, the StableRisk Interest Rates Index only tracks the principal value of the bonds, and only models income from short-term 1-month LIBOR. In addition, a large proportion of this index's underperformance may also be due to the inclusion of transaction costs in the index.

TABLE 7

Performance statistics for the StableRisk Composite Index for the period from 1992 through August 2010.
StableRisk Composite Index Performance

| January 1992-<br>August 2010 | StableRisk Composite Index |
|---|---|
| Mean Return | 17.1% |
| Standard Deviation | 17.2% |
| Sharpe Ratio§ | 0.79 |
| Max. Drawdown | −24.3% |

§Sharpe Ratio is calculated using the 3-month T-bill yield as the riskless rate of return.

The FTSE StableRisk Composite Index is the risk-equalized combination of the StableRisk Asset Class Indices described above. In this example, the overall index volatility is targeted to 15% annually, but realized volatility was slightly higher during the historical period at 17.2%. Its diversification across asset classes yields both a manageable maximum drawdown of less than 25% and attractive absolute and risk-adjusted average annual returns, providing a mean return of 17.1% with a Sharpe Ratio of 0.79. These performance statistics suggest that risk-stabilized and diversified asset allocation, in the absence of a point of view on asset class performance, does provide meaningful benefits to investors. Moreover, the maximum drawdown of −24.3% compares favorably with that of equity-based portfolios.

The StableRisk Indices have high correlations with the traditional long-only asset benchmarks (with the exception of the StableRisk Currency Index, which is by construction similar to an inverse Dollar Index). This is not surprising since both reflect the underlying driving factors of their respective asset classes. Inasmuch as the StableRisk Indices differ from the traditional, long-only benchmarks, this is likely attributable to the risk control and diversification methodology used within the StableRisk Indices.

TABLE 8

Selected historical correlations of the FTSE StableRisk Indices with traditional benchmarks during the period 1995 through August 2010.
Historical Correlations of StableRisk Indices and Traditional Benchmarks*

| January 1995-August 2010 | StableRisk<br>Currency<br>Index | StableRisk<br>Equity<br>Index | StableRisk<br>Interest<br>Rates Index | StableRisk<br>Commodity<br>Index | StableRisk<br>Composite<br>Index |
|---|---|---|---|---|---|
| Dollar Index | −91.5% | 7.3% | −9.5% | −37.8% | −61.7% |
| StableRisk Currency Index | — | −17.9% | 11.0% | 34.3% | 59.5% |
| FTSE All World Total Return Index | 17.7% | 80.7% | −18.7% | 27.2% | 44.9% |
| MSCI World Total Return Index | 17.3% | 80.8% | −18.3% | 25.5% | 44.1% |
| Russell 3000 Total Return Index | 2.5% | 78.8% | −15.2% | 17.2% | 33.7% |
| StableRisk Equity Index | −17.9% | — | −15.2% | 15.4% | 33.4% |
| BarCap Aggregate Bond Index | 22.2% | −6.5% | 66.2% | 7.0% | 44.6% |
| J.P.M. Hedged Government Bond Index | 9.7% | −12.6% | 80.0% | −4.2% | 38.6% |
| StableRisk Interest Rates Index | 11.0% | −15.2% | — | −7.3% | 44.1% |
| CRB Total Return Index | 27.1% | 24.9% | −9.8% | 86.1% | 57.6% |
| DJ UBS Commodity Total Return Index | 29.9% | 25.4% | −8.8% | 87.6% | 61.2% |
| GSCI Total Return Index | 25.0% | 20.3% | −8.6% | 83.1% | 53.3% |
| StableRisk Commodity Index | 34.3% | 15.4% | −7.3% | — | 65.9% |
| StableRisk Composite Index | 59.5% | 33.4% | 44.1% | 65.9% | — |

*Correlations are calculated starting in 1995 because data for several traditional benchmarks prior to 1995 was not available at time of publication.

In summary of this example:

Except in the case of interest rates, the long-only FTSE StableRisk Indices outperformed the corresponding traditional, long-only asset class benchmark in both absolute and risk-adjusted terms during the period from January 1992 through August 2010.

Except in the case of interest rates, each of the FTSE StableRisk Indices had a lower maximum drawdown than its corresponding traditional, long-only asset class benchmark during the period from January 1992 through August 2010.

The FTSE StableRisk Composite Index had a Sharpe ratio of 0.79 during the period from January 1992 through August 2010, which we believe reflects the benefit of diversification across asset classes.

The FTSE StableRisk Indices have the following characteristics:

Passive (rules-based) and transparent;
Investable and replicable;
Broadly-diversified within and across asset classes;
Long-only indices based on a simple, well-documented investment process.

These characteristics make them well-suited for the following three applications:

1. Investment Vehicles. The FTSE StableRisk Indices are investable and replicable and can easily serve as the basis for creating high-capacity, low-cost, long-only investment vehicles to gain exposure to asset classes at stable risk levels.
2. Portfolio Structuring. More risk-efficient portfolio structures may be created by allocating some portion of the strategic or policy asset class allocations to vehicles linked to these indices. This would allow investors to reduce the overall portfolio's sensitivity to changes in short-term market volatility.
3. Benchmarking. The FTSE StableRisk Indices—and customized variations with different target volatilities and/or constituent weights—can be used as performance benchmarks for long-only strategies that invest within and across asset classes, globally. Such benchmarks have the advantage of requiring managers to consider absolute as well as relative risk management.

Index Construction and Maintenance Methodology

Figure 8:
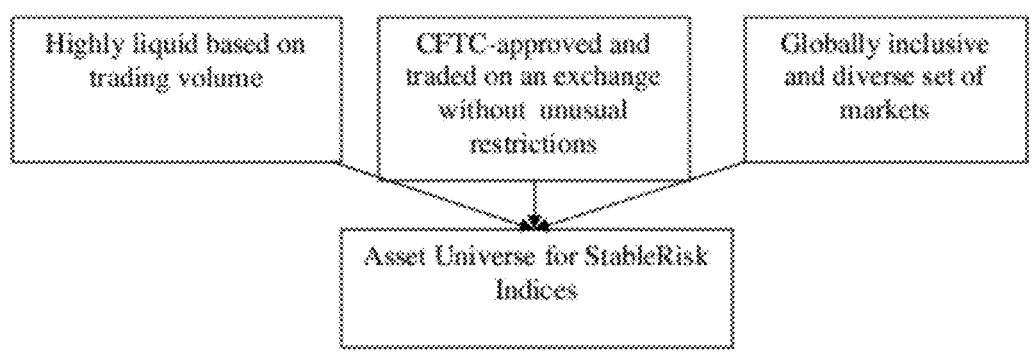
FIG. 8 is the FTSE StableRisk Indices component asset selection criteria.

The following illustration depicts the detailed index construction methodology, as provided schematically in FIG. 8.

Contract Selection. The futures contracts used in these indices are chosen using several criteria based on the practical implications of their trading. For a futures contract to be included, it must be approved by the CFTC and traded on an exchange that does not impose inordinately complex or stringent requirements. The latter criterion can be somewhat subjective and will be applied going forward by the Index Committee. It is included to preserve the investability of the indices. An example of a futures contract that, at the time of this publication, is excluded based on this qualitative restriction, is the Korean three-year bond future, which, although it meets the volume requirement, is traded on an exchange that requires pre-funding and does not permit give-ups. "Give-ups" are futures trades executed with different brokers that are later consolidated with one brokerage house for clearing.

In addition to the regulatory and trading requirements for inclusion, each futures contract must have average aggregate daily trading volume in its component contracts (that is, volume across all currently traded contracts within a contract series) of at least one billion USD. Average daily trading volume for this purpose is calculated annually on December 31st, or another date as determined by the Index Committee.

Contracts currently passing all the above filters and qualifying for inclusion in the Indices are listed in the Example provided infra. Once included, a contract is not removed from the index until its average daily trading volume drops below five hundred million USD. This is more conservative than those inclusion criteria used by many traditional indices, and are made without reference to possible index performance implications.

Figure 9:
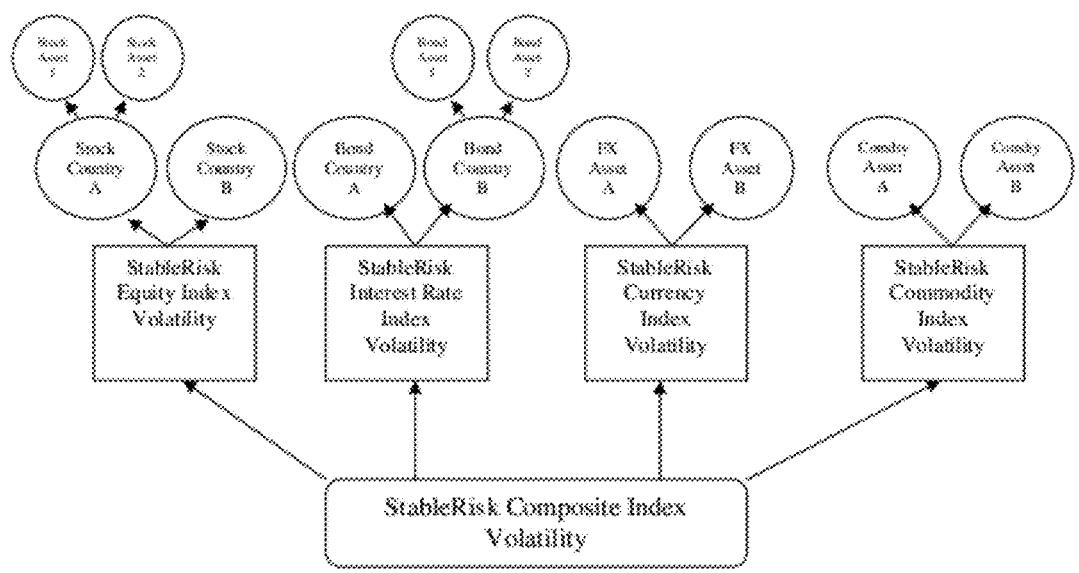
FIG. 9 is the StableRisk Composite Index's risk allocation methodology.
Figure 10:
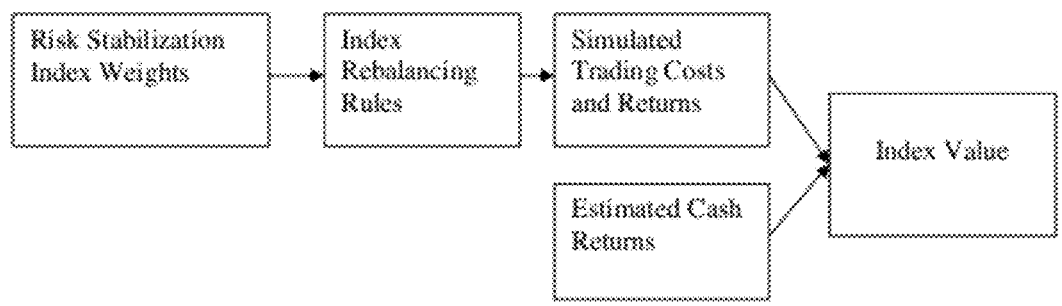
FIG. 10 is the illustration of the process of calculating the FTSE StableRisk Indices.

Risk Allocation. The following process is used to determine the allocation of each index's risk budget among its constituent assets. Please refer to FIG. 9: the goal of this approach is to have each asset-class index target its short-term volatily to the trailing 10-year volatility of its benchmark, and to equally distribute the risk of each of these indices among its constituent assets, taking into account geographic overlap among certain assets. In particular, risk is allocated within the StableRisk Indices in the following manner:

1. Equalize Individual Asset Risk. Normalize the weights of all of the constituent assets of each index, such that portfolios composed of each single asset, at the normalized weight, with the remainder of each portfolio in cash, would have the same estimated short-term volatility.
2. Equalize Asset Group Risk. Within the Interest Rates and Equity asset classes, there exist multiple contracts that track assets which correspond to the markets of (or bonds originated from) a common country. In such cases, rescale the normalized weights of the components of each of these country asset groups such that each country's assets are given approximately the same risk exposure. For example, the five U.S. equity contracts in the global equity index have their weights rescaled such that each has its normalized weight multiplied by 0.2. These rescaling weights are shown in Table B.2.
3. Target Asset Class Portfolio Volatility. Estimate the short-term volatilities of the asset class indices, taking covariances into account, and scale all the assets' weights proportionally such that each asset class portfolio's estimated short-term volatility matches its volatility target. Because long and short interest rate contracts (3 months or less) behave very differently, for the StableRisk Interest Rates Index, this step and step 2 are applied to the short-term interest rate contracts and the longer-duration bond contracts separately, and then combined with a 50%/50% risk allocation.
4. Combine Asset Class Portfolios in the Composite Index. For the StableRisk Composite Index, apply Steps 2 and 3 again, treating each asset class as an "asset group," and combining all of the asset-class portfolios together such that each asset class is allotted an equal risk allocation, and the overall composite portfolio's short-term volatility targets its volatility benchmark which is a fixed 15 percent annually.

Index Calculation. To ensure each index is truly "investable," the following additional steps are taken:

1. Portfolio Rebalancing Rules. Short-term volatility targeting can lead to significant turnover. Rebalancing thresholds are therefore used to limit position changes to those that are at least 25% larger or smaller than the previous position. The result is slightly more variability in volatility relative to the volatility target, but substantially reduced turnover and transaction costs.
2. Simulated Trading with Transaction Costs. Although the restriction to highly liquid contracts and the use of rebalancing thresholds helps to reduce transaction costs, the relatively high turnover associated with the StableRisk Index demands accounting for those costs if index results are to be truly achievable. Transaction costs reflecting trading commissions and market impact are therefore deducted. The assumed costs are shown in Tables B.3 and B.4 of the Appendix. Trades and costs are simulated assuming that the index portfolios have a value of 100 million USD at all times and that only whole contracts may be traded.

3. Cash Returns. Futures contracts are agreements for future delivery of an asset, and only require that a fraction of the notional market exposure of each futures contract be held as margin. Capital not required for margin is assumed to be held as cash earning interest based on current money market rates. Cash returns are simulated as the 1-month LIBOR rate on 80% of the assumed portfolio value, and added to the index value.

Black's Leverage Effect. The fact that the expected returns of financial assets can vary through time is now well established.[2] However, the particular economic mechanisms driving these changes are considerably more complex and controversial, ranging from stochastic dynamic general equilibrium models of asset prices with state-dependent preferences and non-insurable risks to learning behavior under asymmetric information to behavioral models of investor psychology. But with respect to the impact of short-run volatility changes on expected returns, an empirical relation was first documented over three decades ago by Fischer Black (1976), who found an inverse relation between 21-day summed returns and changes in volatility (as measured by the root mean square of returns) over the same period for the daily returns of 30 stocks (mostly Dow Jones Industrials) from 1964 to 1975. Black (1976) proposed two possible explanations for this relationship: (1) a "leverage effect," in which negative returns lead to higher leverage for equityholders, ceteris paribus, yielding higher volatility for equity returns; and (2) changes in tastes and technology lead to increased uncertainty regarding the future prospects of a company, in which case the company's current share price must decline so as to offer investors a higher expected return as compensation for the increased risk. Black's (1976) empirical findings have since been confirmed and updated by several authors including Christie (1982), Cheung and Ng (1992), and Duffee (1995).

[2] See, for example, Ang and Bekaert (2002), Campbell and Shiller (1988), Chordia and Shivakumar (2002), Fama and French (1988, 1989), and Ferson and Harvey (1991).

Time-Varying Expected Returns. Other authors have argued that this relation is attributable to time-varying expected returns (Pindyck, 1984; French, Schwert, and Stambaugh, 1987; Campbell and Hentschel, 1992; and Bekaert and Wu, 2000) or the asymmetric volatility of macroeconomic shocks (Schwert, 1989). Using the S&P 100 index as well as data for the individual stocks in the index, Figlewski and Wang (2000) also document a strong inverse volatility/lagged-return relation associated with negative returns, but observe a number of anomalies that cast some doubt on the leverage-based explanation. Specifically, the inverse relation becomes much weaker when positive returns reduce leverage; it is too small with measured leverage for individual firms and too large when implied volatilities are used, and the volatility change associated with a given change in leverage seems to decay over several months. Most importantly, there is no change in volatility when leverage changes due to a change in outstanding debt or shares, and volatility changes are observed only with stock-price changes, leading Figlewski and Wang (2000) to propose a new label for the observed inverse volatility/lagged-return relation: the "down-market effect." More recently, Hasanhodzic and Lo (2010) test the leverage effect directly by studying a sample of all-equity-financed companies from January 1972 to December 2008, and they find that the leverage effect is just as strong if not stronger, implying that the inverse relationship between price and volatility is not based on leverage, but is more likely driven by time-varying risk premia or cognitive mechanisms of risk perception.

Adaptive Markets Hypothesis. Collectively, these studies provide strong evidence that volatility changes do have an unmistakable effect on expected returns, and are consistent with the Adaptive Markets Hypothesis proposed by Lo (2004, 2005, 2010) and Brennan and Lo (2009), in which market prices fluctuate between efficient and inefficient states due to economy-wide behavioral reactions to systematic shocks. Moreover, the authors' analysis of other asset classes shows that this phenomenon is not limited to U.S. equities, but applies more generally to bonds, foreign currencies, and commodities in many countries. Therefore, the proposed FTSE StableRisk Indices are constructed with the broadest possible collection of liquid futures contracts with the goal of maximizing the benefits of diversification while capturing the risk premia of all asset classes in a stable risk platform.

Backtest, Survivorship, and Data-Snooping Biases. While the historical performance figures of the FTSE StableRisk Indices are compelling, they should be treated with a certain degree of skepticism because of the impact of backtest, survivorship, and data-snooping biases that affect every empirical analysis of investment performance that employs historical data. Since certain investment products may exhibit attractive historical returns simply due to chance, it is important to understand the rationale for superior performance and not rely solely on historical returns.

At the same time, historical results cannot be ignored because they do contain useful information about an investment product's realized returns during specific periods in the market's past. For example, in comparing two investment strategies, most investors today would insist on understanding the relative performance of the two strategies during the fourth quarter of 2008, one of the most challenging periods for financial markets since 1929. Such results are, of course, still subject to backtest bias like any other empirical study of past performance—for example, the better-performing strategy may simply have been short S&P 500 futures, not because of an active bet, but due to a policy of maintaining a consistently low market beta. Nevertheless, the historical differences in realized returns may also signal significant differences in the strategies' portfolio construction processes, risk management protocols, and liquidity characteristics.

In other words, historical performance is a double-edged sword that can overstate the benefits of an investment strategy, but can also provide valuable information about risk and reward. The challenge is, of course, separating signal from noise, which can only be done through a combination of quantitative and qualitative processes that include judgment, intuition, experience, and a fully articulated investment philosophy. See Leamer (1978), Lo and MacKinlay (1990), and Lo (1994, 2010) for more detailed discussions of backtest bias.

StableRisk Portfolios

The StableRisk Indices are applied to manage individual assets, and portfolios, to targeted volatilities. Risk stabilization modified the short-term risk of any particular individual asset to a long-term volatility target. In other words, risk stabilization mitigates variations in asset-class risk across time, thereby improving portfolio diversification across time as well as across assets. This is not the same as the so-called "risk-parity" methods, which attempt to equilibrate the risk contribution of each asset (including the estimated effects of covariances) across the portfolio at any given point in time, but do not attempt to control absolute risk levels.

Figure 11:
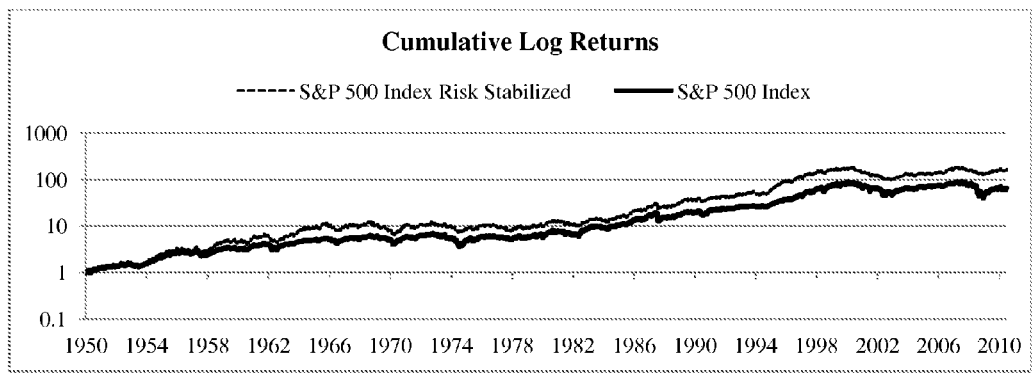
FIG. 11 represents a hypothetical comparison of the cumulative returns of the S&P 500 Index and a risk stabilized S&P 500 Index, over the period from March 1950 to August 2010.
Figure 12:
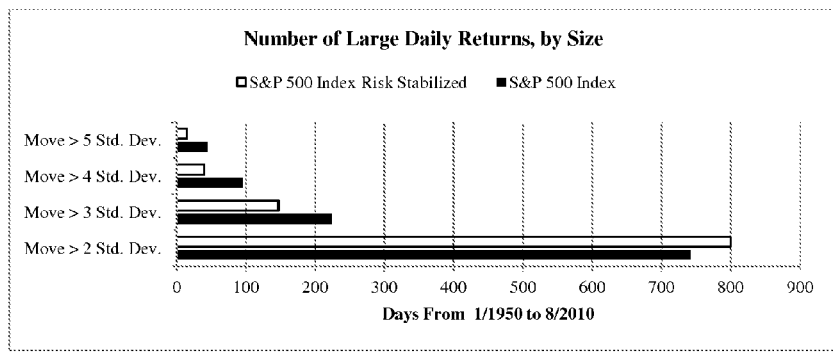
FIG. 12 represents the counts of daily returns of the S&P 500 Index and the risk stabilized S&P 500 Index that are greater than 2 standard deviations of the series in magnitude, during the period from January 1950 through August 2010.
Figure 13:
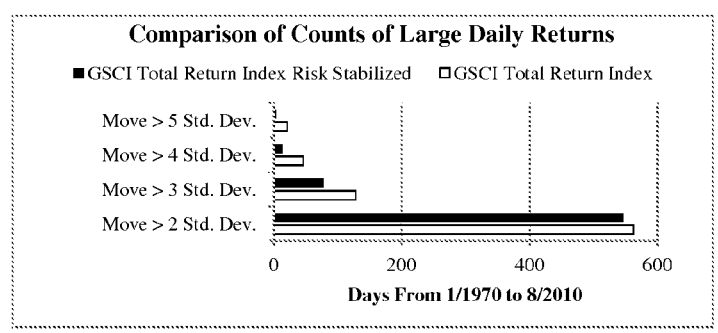
FIG. 13 represents the counts of daily returns of the GSCI Total Return Index and the risk stabilized GSCI Total Return Index that are greater than 2 standard deviations of the series in magnitude, during the period from January 1970 through August 2010.
Figure 14:
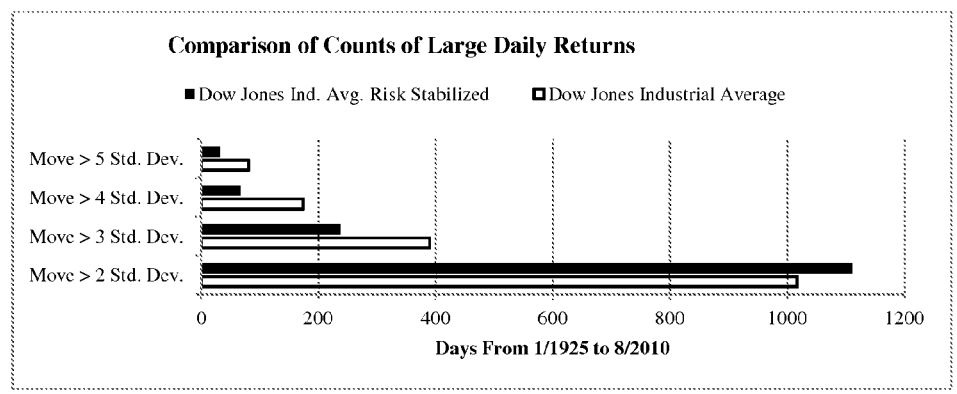
FIG. 14 represents the counts of daily returns of the Dow Jones Industrial Average Index and the risk stabilized Dow Jones Industrial Average Index that are greater than 2 standard deviations of the series in magnitude, during the period from January 1925 through August 2010.
Figure 15:
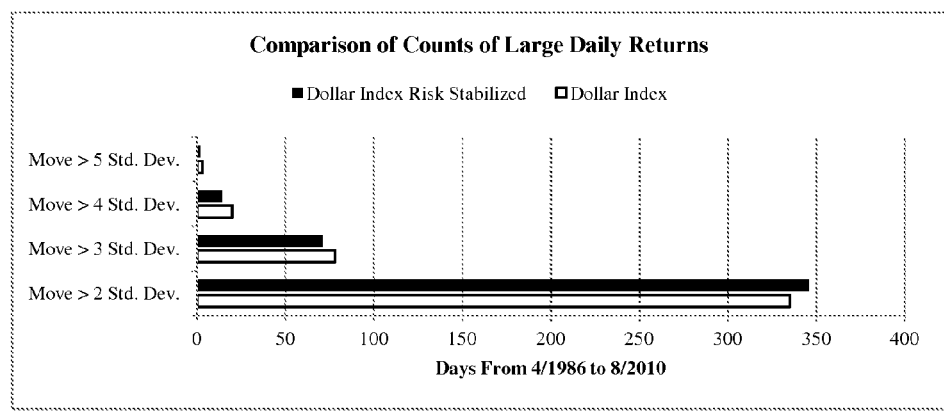
FIG. 15 represents the counts of daily returns of the U.S. Dollar Index and the risk stabilized U.S. Dollar Index that are greater than 2 standard deviations of the series in magnitude, during the period from April 1986 through August 2010.
Figure 16:
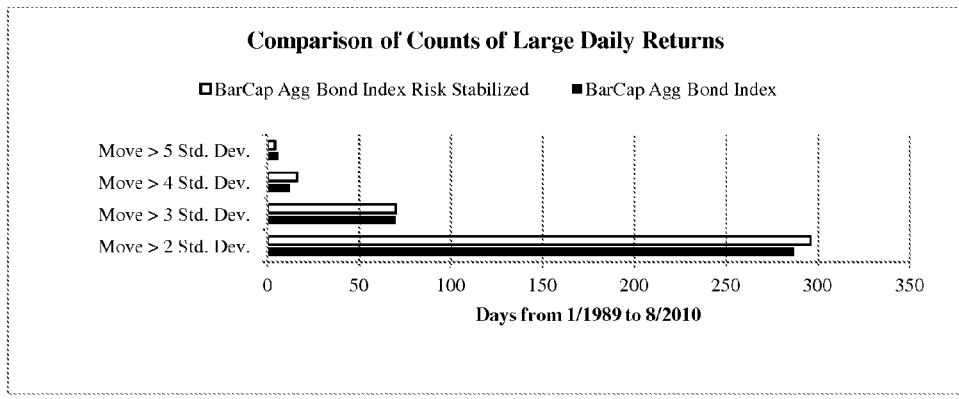
FIG. 16 represents the counts of daily returns of the Barclays Capital Aggregate Bond Index and the risk stabilized Barclays Capital Aggregate Bond Index that are greater than 2 standard deviations of the series in magnitude, during the period from January 1989 through August 2010.

At the same time, risk stabilization appears to have a salutory effect on individual asset returns. As shown in FIG. 11, the cumulative returns of the risk stabilized S&P 500 Index are greater over the same period while having the identical (by construction) overall standard deviation.

Figure 17:
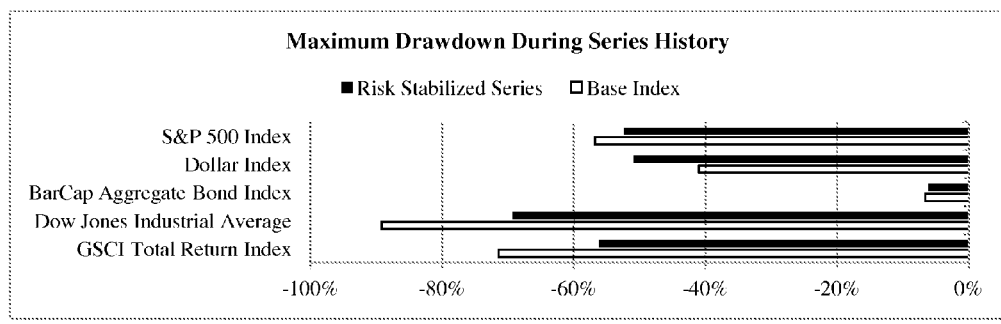
FIG. 17 represents the maximum drawdown statistics from several traditional asset class benchmarks and their respective risk stabilized versions, computed over the same time periods as the original benchmarks described in FIGS. 12-16.
Figure 18:
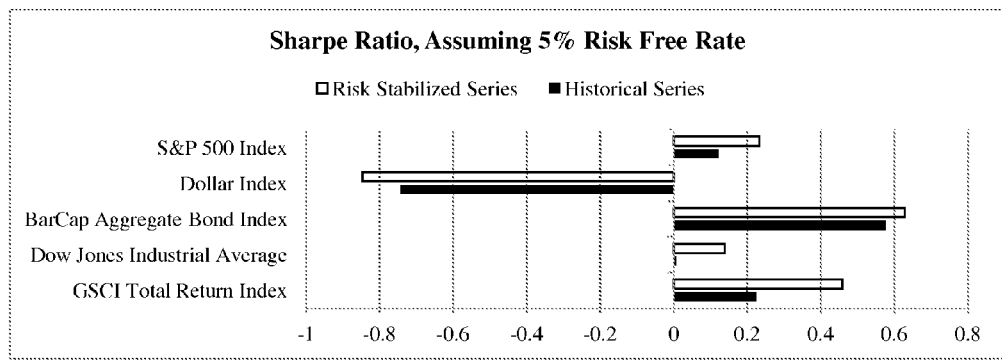
FIG. 18 represents the sharpe ratio statistics from several traditional asset class benchmarks and their respective risk stabilized versions, computed over the same time periods as the original benchmarks described in FIGS. 12-16, using a fixed 5% rate as the riskless interest rate.
Figure 19:
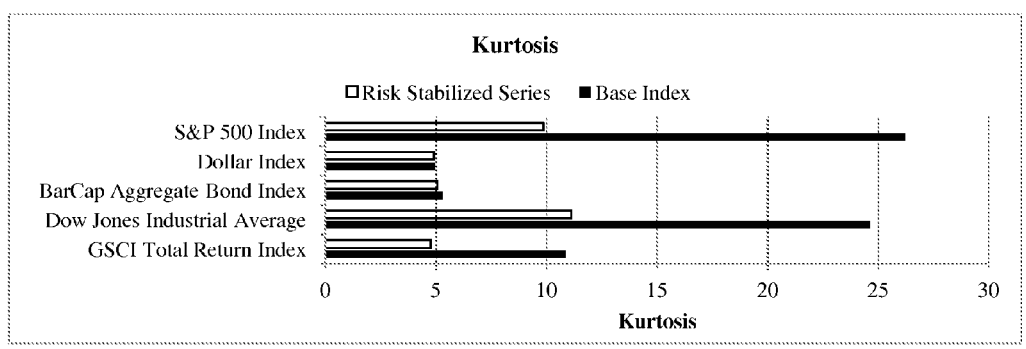
FIG. 19 represents the kurtosis statistics from several traditional asset class benchmarks and their respective risk stabilized versions, computed over the same time periods as the original benchmarks described in FIGS. 12-16.

Beyond the simple and apparent advantages of this type of volatility management on the S&P 500, we see a wide series of improvements in risk control and tail risk management using risk stabilization. The number of large tail events is reduced across asset class benchmark indices as shown in FIGS. 12-16 in all cases except the Dollar Index. Other measures of tail risk, such as maximum drawdown and kurtosis, approach values closer to those expected under the normal distribution as shown in FIGS. 17-19. Note that the historical periods used are different for each asset class due to data availability constraints.

Risk control also improves, in both absolute and variance-relative terms, the maximum drawdown for all indices except the Dollar Index. The deviation of the Dollar Index from this pattern is primarily due to the fact that by holding a long position in the U.S. dollar, and therefore a short position in a basket of world currencies, it captures the "inverse" of a currency risk premium. Thus if we invert the Dollar Index, its risk-stabilized performance becomes aligned with that of other asset class benchmarks that offer a positive risk premium, and is consistent with the performance of the StableRisk Currency Index.

Overall, the risk stabilization methodology is believed by the authors to materially improve the stability and consistency of the return distribution of assets, capturing the long-term risk premium inherent in each asset class while reducing the heteroskedasticity of the return series over time. Although any improvement associated with applying the methodology to bonds is negligible, the substantial improvements in the equity and commodity index performance (as well as the performance of the inverse U.S. Dollar Index) demonstrate that on an empirical basis, risk stabilization provides significant advantages to portfolios over simple buy-and-hold strategies. While these advantages may not have been available net of transaction costs in the distant past, recent innovations and improvements in the futures markets have dramatically reduced transaction costs, opening up the possibility for investments with more stable risk and the associated potential advantages of smaller maximum drawdowns, less tail risk, and higher risk-adjusted returns.

EXAMPLES

TABLE B.1

Information detailing the futures contracts which compose the StableRisk Indices.
Contracts Included in the StableRisk Indices, by Index as of 2010

| Futures Contract Name | Bloomberg Ticker | Currency | Exchange | Contract Months | Country | Index* |
|---|---|---|---|---|---|---|
| 10-Year Commonwealth Treasury Bond Futures | XMA Comdty | AUD | SFE | HMUZ | AUS | Interest Rates Index |
| 2-Year US Treasury Note Futures | TUA Comdty | USD | CBT | HMUZ | USA | Interest Rates Index |
| 3-Month (Short) Sterling Interest Rate Futures | L A Comdty | GBP | LIF-NYSE | HMUZ | UK | Interest Rates Index |
| 3-Month Euro Euribor Interest Rate Futures | ERA Comdty | EUR | LIF-NYSE | HMUZ | EU | Interest Rates Index |
| 3-Month Euro Swiss Franc Interest Rate Futures | ESA Comdty | CHF | LIF-NYSE | HMUZ | SWI | Interest Rates Index |
| 3-Month Euroyen Futures | YEA Comdty | JPY | TFX | HMUZ | JAP | Interest Rates Index |
| 3-Year Commonwealth Treasury Bond Futures | YMA Comdty | AUD | SFE | HMUZ | AUS | Interest Rates Index |
| 30-Day Federal Fund Rate Futures | FFA Comdty | USD | CBT | FGHJKMNQUVXZ | USA | Interest Rates Index |
| 30-Day ASX Interbank Cash Rate Futures | IBA Comdty | AUD | SFE | FGHJKMNQUVXZ | AUS | Interest Rates Index |
| 90-Day EuroDollar Time Deposit Futures | EDA Comdty | USD | CME | HMUZ | USA | Interest Rates Index |
| ASX 90-Day Bank Accepted Bills Futures | IRA Comdty | AUD | SFE | HMUZ | AUS | Interest Rates Index |
| 5-Year US Treasury Note Futures | FVA Comdty | USD | CBT | HMUZ | USA | Interest Rates Index |
| Canadian 10 Year Bond Futures | CAN Comdty | CAD | MSE | HMUZ | CAN | Interest Rates Index |
| Canadian 3-Month Bankers Acceptance Futures | BAA Comdty | CAD | MSE | HMUZ | CAN | Interest Rates Index |
| Euro-Bobl Bond Futures | OEA Comdty | EUR | EUX | HMUZ | EU | Interest Rates Index |
| Euro-Bund Bond Futures | RXA Comdty | EUR | EUX | HMUZ | EU | Interest Rates Index |
| Euro-Schatz Bond Futures | DUA Comdty | EUR | EUX | HMUZ | EU | Interest Rates Index |
| Japanese 10-Year Bond Futures (JGB) | JBA Comdty | JPY | TSE | HMUZ | JAP | Interest Rates Index |
| Long Gilt Futures | G A Comdty | GBP | LIF-NYSE | HMUZ | UK | Interest Rates Index |
| New Zealand 90-Day Bank Bill Futures | ZBA Comdty | NZD | SFE | HMUZ | NZ | Interest Rates Index |
| US 10-Year Treasury Note Futures | TYA Comdty | USD | CBT | HMUZ | USA | Interest Rates Index |
| US 30-Year Long Bond Futures | USA Comdty | USD | CBT | HMUZ | USA | Interest Rates Index |
| Brent Crude Oil Futures | COA Comdty | USD | ICE | FGHJKMNQUVXZ | — | Commodity Index |
| Coffee 'C' Futures | KCA Comdty | USD | NYB-ICE | HKNUZ | — | Commodity Index |
| Copper Futures | LPA Comdty | USD | LME | FGHJKMNQUVXZ | — | Commodity Index |
| Corn Futures | C A Comdty | USD | CBT | HMUZ | — | Commodity Index |
| Gasoil (IPE) Futures | QSA Comdty | USD | ICE | FGHJKMNQUVXZ | — | Commodity Index |
| Gasoline RBOB Futures** | XBA Comdty | USD | NYM | FGHJKMNQUVXZ | — | Commodity Index |
| Gold 100 Oz Futures | GCA Comdty | USD | CMX | GJMQVZ | — | Commodity Index |
| Heating Oil Futures | HOA Comdty | USD | NYM | FGHJKMNQUVXZ | — | Commodity Index |
| Live Cattle Futures | LCA Comdty | USD | CME | GJMQVZ | — | Commodity Index |
| Natural Gas Futures | NGA Comdty | USD | NYM | FGHJKMNQUVXZ | — | Commodity Index |
| Primary Nickel Futures | LNA Comdty | USD | LME | FGHJKMNQUVXZ | — | Commodity Index |
| Primary Aluminum Futures | LAA Comdty | USD | LME | FGHJKMNQUVXZ | — | Commodity Index |
| Silver 5000 Oz Futures | SIA Comdty | USD | CMX | FHKNUZ | — | Commodity Index |
| Soybean Futures | S A Comdty | USD | CBT | FHKNQUX | — | Commodity Index |
| Soybean Meal Futures | SMA Comdty | USD | CBT | FHKNQUVZ | — | Commodity Index |
| Soybean Oil Futures | BOA Comdty | USD | CBT | FHKNQUVZ | — | Commodity Index |
| Sugar #11 Futures | SBA Comdty | USD | NYB-ICE | HKNV | — | Commodity Index |
| Wheat Futures | W A Comdty | USD | CBT | HKNUZ | — | Commodity Index |
| WTI Crude Oil Futures | CLA Comdty | USD | NYM | FGHJKMNQUVXZ | — | Commodity Index |
| Zinc Futures | LXA Comdty | USD | LME | FGHJKMNQUVXZ | — | Commodity Index |

TABLE B.1-continued

Information detailing the futures contracts which compose the StableRisk Indices.
Contracts Included in the StableRisk Indices, by Index as of 2010

| Futures Contract Name | Bloomberg Ticker | Currency | Exchange | Contract Months | Country | Index* |
|---|---|---|---|---|---|---|
| Amsterdam Exchange Index Futures | EOA Index | EUR | EOE | FGHJKMNQUVXZ | NDL | Equity Index |
| CAC 40 10 Euro Index Futures | CFA Index | EUR | EOP | FGHJKMNQUVXZ | FRA | Equity Index |
| DAX Index Futures | GXA Index | EUR | EUX | HMUZ | GER | Equity Index |
| E-mini Dow Jones Industrial Average Futures | DMA Index | USD | CBT | HMUZ | USA | Equity Index |
| E-mini NASDAQ 100 Index Futures | NQA Index | USD | CME | HMUZ | USA | Equity Index |
| E-mini S&P 500 Index Futures | ESA Index | USD | CME | HMUZ | USA | Equity Index |
| E-mini S&P Midcap 400 Futures | FAA Index | USD | CME | HMUZ | USA | Equity Index |
| EURO STOXX 50 Index Futures | VGA Index | EUR | EUX | HMUZ | EU | Equity Index |
| FTSE 100 Index Futures | Z A Index | GBP | LIF-NYSE | HMUZ | UK | Equity Index |
| FTSE JSE Top 40 Index | AIA Index | ZAR | SAF | HMUZ | S.AF | Equity Index |
| FTSE MIB Index Futures | STA Index | EUR | MIL | HMUZ | ITL | Equity Index |
| Hang Seng Enterprise Index Futures | HCA Index | HKD | HKG | FGHJKMNQUVXZ | HK | Equity Index |
| Hang Seng Index Futures | HIA Index | HKD | HKG | HMUZ | HK | Equity Index |
| IBEX 35 Index Futures | IBA Index | EUR | MFM | FGHJKMNQUVXZ | SPA | Equity Index |
| MSCI Taiwan Stock Index Futures | TWA Index | USD | SGX | FGHJKMNQUVXZ | TWA | Equity Index |
| Nikkei 225 (OSE) Index Futures | NKA Index | JPY | OSE | HMUZ | JAP | Equity Index |
| OMXS30 Index Futures | QCA Index | SEK | SSE-OMX | FGHJKMNQUVXZ | SWE | Equity Index |
| E-mini Russell 200 Index Futures | RTAA Index | USD | NYF-ICE | HMUZ | USA | Equity Index |
| S&P TSX 60 Index Futures | PTA Index | CAD | MSE | HMUZ | CAN | Equity Index |
| ASX SPI 200 Index Futures | XPA Index | AUD | SFE | HMUZ | AUS | Equity Index |
| TOPIX Index Futures | TPA Index | JPY | TSE | HMUZ | JAP | Equity Index |
| Australian Dollar Futures | ADA Curncy | USD | CME | HMUZ | AUS | Currency Index |
| British Pounds Sterling Futures | BPA Curncy | USD | CME | HMUZ | GBP | Currency Index |
| Canadian Dollar Futures | CDA Curncy | USD | CME | HMUZ | CAD | Currency Index |
| Euro Futures | ECA Curncy | USD | CME | HMUZ | EUR | Currency Index |
| Japanese Yen Futures | JYA Curncy | USD | CME | HMUZ | JAP | Currency Index |
| Swiss Franc Futures | SFA Curncy | USD | CME | HMUZ | CHF | Currency Index |

*The Composite Index contains all of the above contracts.
**The RBOB gasoline contract is proxied by the NY Unleaded gasoline (HUA Comdty) prior to September 2006.

TABLE B.2

The weights in this table are the risk weight multipliers for each contract, by year. An entry specifies that the contract was included in the index in a given year. A non-unitary entry implies that the contract is part of a country group, as discussed in Section 2.
Contract Risk Weights, By Year

| Futures Contract Name | Index* | 2000 | 2001 | 2002 | 2003 | 2004 | 2005 | 2006 | 2007 | 2008 | 2009 | 2010 |
|---|---|---|---|---|---|---|---|---|---|---|---|---|
| 10-Year Commonwealth Treasury Bond Futures | Interest Rates Index | 0.5 | 0.5 | 0.5 | 0.5 | 0.5 | 0.5 | 0.5 | 0.5 | 0.5 | 0.5 | 0.5 |
| 2-Year US Treasury Note Futures | Interest Rates Index | 0.25 | 0.25 | 0.25 | 0.25 | 0.25 | 0.25 | 0.25 | 0.25 | 0.25 | 0.25 | 0.25 |
| 3-Month (Short) Sterling Interest Rate Futures | Interest Rates Index | 1 | 1 | 1 | 1 | 1 | 1 | 1 | 1 | 1 | 1 | 1 |
| 3-Month Euro Euribor Interest Rate Futures | Interest Rates Index | 1 | 1 | 1 | 1 | 1 | 1 | 1 | 1 | 1 | 1 | 1 |
| 3-Month Euro Swiss Franc Interest Rate Futures | Interest Rates Index | 1 | 1 | 1 | 1 | 1 | 1 | 1 | 1 | 1 | 1 | 1 |
| 3-Month Euroyen Futures | Interest Rates Index | 1 | 1 | 1 | 1 | 1 | 1 | 1 | 1 | 1 | 1 | 1 |
| 3-Year Commonwealth Treasury Bond Futures | Interest Rates Index | 0.5 | 0.5 | 0.5 | 0.5 | 0.5 | 0.5 | 0.5 | 0.5 | 0.5 | 0.5 | 0.5 |
| 30-Day Federal Fund Rate Futures | Interest Rates Index | 1 | 1 | 1 | 1 | 1 | 1 | 1 | 1 | 1 | 1 | 1 |
| 30-Day ASX Interbank Cash Rate | Interest Rates Index | | | | | | | 0.5 | 0.5 | 0.5 | 0.5 | 0.5 |
| 90-Day EuroDollar Time Deposit Futures | Interest Rates Index | 1 | 1 | 1 | 1 | 1 | 1 | 1 | 1 | 1 | 1 | 1 |
| ASX 90-Day Bank Accepted Bills Futures | Interest Rates Index | 1 | 1 | 1 | 1 | 1 | 1 | 0.5 | 0.5 | 0.5 | 0.5 | 0.5 |
| 5-Year US Treasury Note Futures | Interest Rates Index | 0.25 | 0.25 | 0.25 | 0.25 | 0.25 | 0.25 | 0.25 | 0.25 | 0.25 | 0.25 | 0.25 |
| Canadian 10 Year Bond Futures | Interest Rates Index | | | | | | | 1 | 1 | 1 | 1 | 1 |
| Canadian 3-Month Bankers Acceptance Futures | Interest Rates Index | 1 | 1 | 1 | 1 | 1 | 1 | 1 | 1 | 1 | 1 | 1 |
| Euro-Bobl Bond Futures | Interest Rates Index | 0.33 | 0.33 | 0.33 | 0.33 | 0.33 | 0.33 | 0.33 | 0.33 | 0.33 | 0.33 | 0.33 |
| Euro-Bund Bond Futures | Interest Rates Index | 0.33 | 0.33 | 0.33 | 0.33 | 0.33 | 0.33 | 0.33 | 0.33 | 0.33 | 0.33 | 0.33 |
| Euro-Schatz Bond Futures | Interest Rates Index | 0.33 | 0.33 | 0.33 | 0.33 | 0.33 | 0.33 | 0.33 | 0.33 | 0.33 | 0.33 | 0.33 |
| Japanese 10-Year Bond Futures (JGB) | Interest Rates Index | 1 | 1 | 1 | 1 | 1 | 1 | 1 | 1 | 1 | 1 | 1 |
| Long Gilt Futures | Interest Rates Index | 1 | 1 | 1 | 1 | 1 | 1 | 1 | 1 | 1 | 1 | 1 |
| New Zealand 90-Day Bank Bill Futures | Interest Rates Index | 1 | 1 | 1 | 1 | 1 | 1 | 1 | 1 | 1 | 1 | 1 |
| US 10-Year Treasury Note Futures | Interest Rates Index | 0.25 | 0.25 | 0.25 | 0.25 | 0.25 | 0.25 | 0.25 | 0.25 | 0.25 | 0.25 | 0.25 |
| US 30-Year Long Bond Futures | Interest Rates Index | 0.25 | 0.25 | 0.25 | 0.25 | 0.25 | 0.25 | 0.25 | 0.25 | 0.25 | 0.25 | 0.25 |
| Brent Crude Oil Futures | Commodity Index | 1 | 1 | 1 | 1 | 1 | 1 | 1 | 1 | 1 | 1 | 1 |
| Coffee 'C' Futures | Commodity Index | | | | | | | | | 1 | 1 | 1 |
| Copper Futures | Commodity Index | | | | | | | | 1 | 1 | 1 | 1 |
| Corn Futures | Commodity Index | 1 | 1 | 1 | 1 | 1 | 1 | 1 | 1 | 1 | 1 | 1 |
| Gasoil (IPE) Futures | Commodity Index | | | | | | | 1 | 1 | 1 | 1 | 1 |
| Gasoline RBOB Futures** | Commodity Index | 1 | 1 | 1 | 1 | 1 | 1 | 1 | 1 | 1 | 1 | 1 |
| Gold 100 Oz Futures | Commodity Index | 1 | 1 | 1 | 1 | 1 | 1 | 1 | 1 | 1 | 1 | 1 |
| Heating Oil Futures | Commodity Index | | 1 | 1 | 1 | 1 | 1 | 1 | 1 | 1 | 1 | 1 |
| Live Cattle Futures | Commodity Index | | | | | | | | | 1 | 1 | 1 |
| Natural Gas Futures | Commodity Index | 1 | 1 | 1 | 1 | 1 | 1 | 1 | 1 | 1 | 1 | 1 |
| Primary Nickel Futures | Commodity Index | | | | | | | | | 1 | 1 | 1 |

TABLE B.2-continued

The weights in this table are the risk weight multipliers for each contract, by year. An entry specifies that the contract was included in the index in a given year. A non-unitary entry implies that the contract is part of a country group, as discussed in Section 2.
Contract Risk Weights, By Year

| Futures Contract Name | Index* | 2000 | 2001 | 2002 | 2003 | 2004 | 2005 | 2006 | 2007 | 2008 | 2009 | 2010 |
|---|---|---|---|---|---|---|---|---|---|---|---|---|
| Primary Aluminum Futures | Commodity Index | | | | | | | 1 | 1 | 1 | 1 | 1 |
| Silver 5000 Oz Futures | Commodity Index | | | | | | | | 1 | 1 | 1 | 1 |
| Soybean Futures | Commodity Index | 1 | 1 | 1 | 1 | 1 | 1 | 1 | 1 | 1 | 1 | 1 |
| Soybean Meal Futures | Commodity Index | | | | | | | | | 1 | 1 | 1 |
| Soybean Oil Futures | Commodity Index | | | | | | | | | 1 | 1 | 1 |
| Sugar #11 Futures | Commodity Index | | | | | | | | 1 | 1 | 1 | 1 |
| Wheat Futures | Commodity Index | | | | | | | | 1 | 1 | 1 | 1 |
| WTI Crude Oil Futures | Commodity Index | 1 | 1 | 1 | 1 | 1 | 1 | 1 | 1 | 1 | 1 | 1 |
| Zinc Futures | Commodity Index | | | | | | | | 1 | 1 | 1 | 1 |
| Amsterdam Exchange Index Futures | Equity Index | 1 | 1 | 1 | 1 | 1 | 1 | 1 | 1 | 1 | 1 | 1 |
| CAC 40 10 Euro Index Futures | Equity Index | 1 | 1 | 1 | 1 | 1 | 1 | 1 | 1 | 1 | 1 | 1 |
| DAX Index Futures | Equity Index | 1 | 1 | 1 | 1 | 1 | 1 | 1 | 1 | 1 | 1 | 1 |
| E-mini Dow Jones Industrial Average Futures | Equity Index | 0.5 | .33 | 0.33 | 0.33 | 0.33 | 0.33 | 0.25 | 0.25 | 0.25 | 0.2 | 0.2 |
| E-mini NASDAQ 100 Index Futures | Equity Index | | .33 | 0.33 | 0.33 | 0.33 | 0.33 | 0.25 | 0.25 | 0.25 | 0.2 | 0.2 |
| E-mini S&P 500 Index Futures | Equity Index | 0.5 | .33 | 0.33 | 0.33 | 0.33 | 0.33 | 0.25 | 0.25 | 0.25 | 0.2 | 0.2 |
| E-mini S&P Midcap 400 Futures | Equity Index | | | | | | | 0.25 | 0.25 | 0.25 | 0.2 | 0.2 |
| EURO STOXX 50 Index Futures | Equity Index | | 1 | 1 | 1 | 1 | 1 | 1 | 1 | 1 | 1 | 1 |
| FTSE 100 Index Futures | Equity Index | 1 | 1 | 1 | 1 | 1 | 1 | 1 | 1 | 1 | 1 | 1 |
| FTSE JSE Top 40 Index Futures | Equity Index | | | | | | | | 1 | 1 | 1 | 1 |
| FTSE MIB Index Futures | Equity Index | | | | | | | 1 | 1 | 1 | 1 | 1 |
| Hang Seng Enterprise Index Futures | Equity Index | | | | | | | | | 0.5 | 0.5 | 0.5 |
| Hang Seng Index Futures | Equity Index | 1 | 1 | 1 | 1 | 1 | 1 | 1 | 1 | 0.5 | 0.5 | 0.5 |
| IBEX 35 Index Futures | Equity Index | | 1 | 1 | 1 | 1 | 1 | 1 | 1 | 1 | 1 | 1 |
| MSCI Taiwan Stock Index Futures | Equity Index | | | | | | | | | 1 | 1 | 1 |
| Nikkei 225 (OSE) Index Futures | Equity Index | 0.5 | 0.5 | 0.5 | 0.5 | 0.5 | 0.5 | 0.5 | 0.5 | 0.5 | 0.5 | 0.5 |
| OMXS30 Index Futures | Equity Index | | | | | | | | 1 | 1 | 1 | 1 |
| E-mini Russell 200 Index Futures | Equity Index | | | | | | | | | | 0.2 | 0.2 |
| S&P TSX 60 Index Futures | Equity Index | | | | | | | | 1 | 1 | 1 | 1 |
| ASX SPI 200 Index Futures | Equity Index | | | | | | | 1 | 1 | 1 | 1 | 1 |
| TOPIX Index Futures | Equity Index | 0.5 | 0.5 | 0.5 | 0.5 | 0.5 | 0.5 | 0.5 | 0.5 | 0.5 | 0.5 | 0.5 |
| Australian Dollar Futures | Currency Index | | | | | | | 1 | 1 | 1 | 1 | 1 |
| British Pounds Sterling Futures | Currency Index | 1 | 1 | 1 | 1 | 1 | 1 | 1 | 1 | 1 | 1 | 1 |
| Canadian Dollar Futures | Currency Index | | | | | | 1 | 1 | 1 | 1 | 1 | 1 |
| Euro Futures | Currency Index | 1 | 1 | 1 | 1 | 1 | 1 | 1 | 1 | 1 | 1 | 1 |
| Japanese Yen Futures | Currency Index | 1 | 1 | 1 | 1 | 1 | 1 | 1 | 1 | 1 | 1 | 1 |
| Swiss Franc Futures | Currency Index | 1 | 1 | 1 | 1 | 1 | 1 | 1 | 1 | 1 | 1 | 1 |

*The Composite Index contains all of the above contracts.
**The RBOB gasoline contract is proxied by the NY Unleaded gasoline (HUA Comdty) prior to September 2006.

TABLE B.3

Market impact cost assumptions used in the StableRisk Index, for the years 2000 through 2010. These costs are listed in basis points (one-hundredth of a percent), and are assumed to be the cost of trading each contract, due to bid-ask spread, and temporary price displacement due to the transaction.
Market Impact Cost Assumptions, by Contract, by Year, in Basis Points

| Futures Contract Name | Index* | 2000 | 2001 | 2002 | 2003 | 2004 | 2005 | 2006 | 2007 | 2008 | 2009 | 2010 |
|---|---|---|---|---|---|---|---|---|---|---|---|---|
| 10-Year Commonwealth Treasury Bond Futures | Interest Rates Index | 2.35 | 2.2 | 2.05 | 1.9 | 1.75 | 1.6 | 1.45 | 1.3 | 1.15 | 1 | 1 |
| 2-Year US Treasury Note Futures | Interest Rates Index | 2.35 | 2.2 | 2.05 | 1.9 | 1.75 | 1.6 | 1.45 | 1.3 | 1.15 | 1 | 1 |
| 3-Month (Short) Sterling Interest Rate Futures | Interest Rates Index | 2.35 | 2.2 | 2.05 | 1.9 | 1.75 | 1.6 | 1.45 | 1.3 | 1.15 | 1 | 1 |
| 3-Month Euro Euribor Interest Rate Futures | Interest Rates Index | 2.35 | 2.2 | 2.05 | 1.9 | 1.75 | 1.6 | 1.45 | 1.3 | 1.15 | 1 | 1 |
| 3-Month Euro Swiss Franc Interest Rate Futures | Interest Rates Index | 2.35 | 2.2 | 2.05 | 1.9 | 1.75 | 1.6 | 1.45 | 1.3 | 1.15 | 1 | 1 |
| 3-Month Euroyen Futures | Interest Rates Index | 2.35 | 2.2 | 2.05 | 1.9 | 1.75 | 1.6 | 1.45 | 1.3 | 1.15 | 1 | 1 |
| 3-Year Commonwealth Treasury Bond Futures | Interest Rates Index | 2.35 | 2.2 | 2.05 | 1.9 | 1.75 | 1.6 | 1.45 | 1.3 | 1.15 | 1 | 1 |
| 30-Day Federal Fund Rate Futures | Interest Rates Index | 2.35 | 2.2 | 2.05 | 1.9 | 1.75 | 1.6 | 1.45 | 1.3 | 1.15 | 1 | 1 |
| 30-Day ASX Interbank Cash Rates | Interest Rates Index | 2.35 | 2.2 | 2.05 | 1.9 | 1.75 | 1.6 | 1.45 | 1.3 | 1.15 | 1 | 1 |
| 90-Day EuroDollar Time Deposit Futures | Interest Rates Index | 2.35 | 2.2 | 2.05 | 1.9 | 1.75 | 1.6 | 1.45 | 1.3 | 1.15 | 1 | 1 |
| ASX 90-Day Bank Accepted Bills Futures | Interest Rates Index | 2.35 | 2.2 | 2.05 | 1.9 | 1.75 | 1.6 | 1.45 | 1.3 | 1.15 | 1 | 1 |

TABLE B.3-continued

Market impact cost assumptions used in the StableRisk Index, for the years 2000 through 2010.
These costs are listed in basis points (one-hundredth of a percent), and are assumed to be the cost of trading
each contract, due to bid-ask spread, and temporary price displacement due to the transaction.
Market Impact Cost Assumptions, by Contract, by Year, in Basis Points

| Futures Contract Name | Index* | 2000 | 2001 | 2002 | 2003 | 2004 | 2005 | 2006 | 2007 | 2008 | 2009 | 2010 |
|---|---|---|---|---|---|---|---|---|---|---|---|---|
| 5-Year US Treasury Note Futures | Interest Rates Index | 2.35 | 2.2 | 2.05 | 1.9 | 1.75 | 1.6 | 1.45 | 1.3 | 1.15 | 1 | 1 |
| Canadian 10 Year Bond Futures | Interest Rates Index | 7.05 | 6.6 | 6.15 | 5.7 | 5.25 | 4.8 | 4.35 | 3.9 | 3.45 | 3 | 3 |
| Canadian 3-Month Bankers Acceptance Futures | Interest Rates Index | 2.35 | 2.2 | 2.05 | 1.9 | 1.75 | 1.6 | 1.45 | 1.3 | 1.15 | 1 | 1 |
| Euro-Bobl Bond Futures | Interest Rates Index | 2.35 | 2.2 | 2.05 | 1.9 | 1.75 | 1.6 | 1.45 | 1.3 | 1.15 | 1 | 1 |
| Euro-Bund Bond Futures | Interest Rates Index | 2.35 | 2.2 | 2.05 | 1.9 | 1.75 | 1.6 | 1.45 | 1.3 | 1.15 | 1 | 1 |
| Euro-Schatz Bond Futures | Interest Rates Index | 2.35 | 2.2 | 2.05 | 1.9 | 1.75 | 1.6 | 1.45 | 1.3 | 1.15 | 1 | 1 |
| Japanese 10-Year Bond Futures (JGB) | Interest Rates Index | 2.35 | 2.2 | 2.05 | 1.9 | 1.75 | 1.6 | 1.45 | 1.3 | 1.15 | 1 | 1 |
| Long Gilt Futures | Interest Rates Index | 2.35 | 2.2 | 2.05 | 1.9 | 1.75 | 1.6 | 1.45 | 1.3 | 1.15 | 1 | 1 |
| New Zealand 90-Day Bank Bill Futures | Interest Rates Index | 2.35 | 2.2 | 2.05 | 1.9 | 1.75 | 1.6 | 1.45 | 1.3 | 1.15 | 1 | 1 |
| US 10-Year Treasury Note Futures | Interest Rates Index | 2.35 | 2.2 | 2.05 | 1.9 | 1.75 | 1.6 | 1.45 | 1.3 | 1.15 | 1 | 1 |
| US 30-Year Long Bond Futures | Interest Rates Index | 2.35 | 2.2 | 2.05 | 1.9 | 1.75 | 1.6 | 1.45 | 1.3 | 1.15 | 1 | 1 |
| Brent Crude Oil Futures | Commodity Index | 14.80 | 13.86 | 12.91 | 11.97 | 11.02 | 10.08 | 9.135 | 8.19 | 7.245 | 6.3 | 6.3 |
| Coffee 'C' Futures | Commodity Index | 15.74 | 14.74 | 13.73 | 12.73 | 11.72 | 10.72 | 9.715 | 8.71 | 7.705 | 6.7 | 6.7 |
| Copper Futures | Commodity Index | 12.69 | 11.88 | 11.07 | 10.26 | 9.45 | 8.64 | 7.83 | 7.02 | 6.21 | 5.4 | 5.4 |
| Corn Futures | Commodity Index | 22.56 | 21.12 | 19.68 | 18.24 | 16.8 | 15.36 | 13.92 | 12.48 | 11.04 | 9.6 | 9.6 |
| Gasoil (IPE) Futures | Commodity Index | 31.72 | 29.7 | 27.67 | 25.65 | 23.62 | 21.6 | 19.57 | 17.55 | 15.52 | 13.5 | 13.5 |
| Gasoline RBOB Futures** | Commodity Index | 12.93 | 12.1 | 11.275 | 10.45 | 9.625 | 8.8 | 7.975 | 7.15 | 6.325 | 5.5 | 5.5 |
| Gold 100 Oz Futures | Commodity Index | 18.56 | 17.38 | 16.19 | 15.01 | 13.82 | 12.64 | 11.45 | 10.27 | 9.085 | 7.9 | 7.9 |
| Heating Oil Futures | Commodity Index | 19.03 | 17.82 | 16.60 | 15.39 | 14.17 | 12.96 | 11.74 | 10.53 | 9.315 | 8.1 | 8.1 |
| Live Cattle Futures | Commodity Index | 18.33 | 17.16 | 15.99 | 14.82 | 13.65 | 12.48 | 11.31 | 10.14 | 8.97 | 7.8 | 7.8 |
| Natural Gas Futures | Commodity Index | 13.16 | 12.32 | 11.48 | 10.64 | 9.8 | 8.96 | 8.12 | 7.28 | 6.44 | 5.6 | 5.6 |
| Primary Nickel Futures | Commodity Index | 13.39 | 12.54 | 11.68 | 10.83 | 9.975 | 9.12 | 8.265 | 7.41 | 6.555 | 5.7 | 5.7 |
| Primary Aluminum Futures | Commodity Index | 13.87 | 12.98 | 12.10 | 11.21 | 10.33 | 9.44 | 8.555 | 7.67 | 6.785 | 5.9 | 5.9 |
| Silver 5000 Oz Futures | Commodity Index | 32.9 | 30.8 | 28.7 | 26.6 | 24.5 | 22.4 | 20.3 | 18.2 | 16.1 | 14 | 14 |
| Soybean Futures | Commodity Index | 13.63 | 12.76 | 11.89 | 11.02 | 10.15 | 9.28 | 8.41 | 7.54 | 6.67 | 5.8 | 5.8 |
| Soybean Meal Futures | Commodity Index | 24.67 | 23.1 | 21.52 | 19.95 | 18.37 | 16.8 | 15.22 | 13.65 | 12.07 | 10.5 | 10.5 |
| Soybean Oil Futures | Commodity Index | 22.09 | 20.68 | 19.27 | 17.86 | 16.45 | 15.04 | 13.63 | 12.22 | 10.81 | 9.4 | 9.4 |
| Sugar #11 Futures | Commodity Index | 35.25 | 33 | 30.75 | 28.5 | 26.25 | 24 | 21.75 | 19.5 | 17.25 | 15 | 15 |
| Wheat Futures | Commodity Index | 18.8 | 17.6 | 16.4 | 15.2 | 14 | 12.8 | 11.6 | 10.4 | 9.2 | 8 | 8 |
| WTI Crude Oil Futures | Commodity Index | 14.1 | 13.2 | 12.3 | 11.4 | 10.5 | 9.6 | 8.7 | 7.8 | 6.9 | 6 | 6 |
| Zinc Futures | Commodity Index | 27.02 | 25.3 | 23.57 | 21.85 | 20.12 | 18.4 | 16.67 | 14.95 | 13.22 | 11.5 | 11.5 |
| Amsterdam Exchange Index Futures | Equity Index | 11.75 | 11 | 10.25 | 9.5 | 8.75 | 8 | 7.25 | 6.5 | 5.75 | 5 | 5 |
| CAC 40 10 Euro Index Futures | Equity Index | 4.7 | 4.4 | 4.1 | 3.8 | 3.5 | 3.2 | 2.9 | 2.6 | 2.3 | 2 | 2 |
| DAX Index Futures | Equity Index | 2.35 | 2.2 | 2.05 | 1.9 | 1.75 | 1.6 | 1.45 | 1.3 | 1.15 | 1 | 1 |
| E-mini Dow Jones Industrial Average Futures | Equity Index | 9.4 | 8.8 | 8.2 | 7.6 | 7 | 6.4 | 5.8 | 5.2 | 4.6 | 4 | 4 |
| E-mini NASDAQ 100 Index Futures | Equity Index | 4.7 | 4.4 | 4.1 | 3.8 | 3.5 | 3.2 | 2.9 | 2.6 | 2.3 | 2 | 2 |
| E-mini S&P 500 Index Futures | Equity Index | 2.35 | 2.2 | 2.05 | 1.9 | 1.75 | 1.6 | 1.45 | 1.3 | 1.15 | 1 | 1 |

TABLE B.3-continued

Market impact cost assumptions used in the StableRisk Index, for the years 2000 through 2010.
These costs are listed in basis points (one-hundredth of a percent), and are assumed to be the cost of trading each contract, due to bid-ask spread, and temporary price displacement due to the transaction.
Market Impact Cost Assumptions, by Contract, by Year, in Basis Points

| Futures Contract Name | Index* | 2000 | 2001 | 2002 | 2003 | 2004 | 2005 | 2006 | 2007 | 2008 | 2009 | 2010 |
|---|---|---|---|---|---|---|---|---|---|---|---|---|
| E-mini S&P Midcap 400 Futures | Equity Index | 9.4 | 8.8 | 8.2 | 7.6 | 7 | 6.4 | 5.8 | 5.2 | 4.6 | 4 | 4 |
| EURO STOXX 50 Index Futures | Equity Index | 11.75 | 11 | 10.25 | 9.5 | 8.75 | 8 | 7.25 | 6.5 | 5.75 | 5 | 5 |
| FTSE 100 Index Futures | Equity Index | 5.875 | 5.5 | 5.125 | 4.75 | 4.375 | 4 | 3.625 | 3.25 | 2.875 | 2.5 | 2.5 |
| FTSE JSE Top 40 Index Futures | Equity Index | 7.05 | 6.6 | 6.15 | 5.7 | 5.25 | 4.8 | 4.35 | 3.9 | 3.45 | 3 | 3 |
| FTSE MIB Index Futures | Equity Index | 2.35 | 2.2 | 2.05 | 1.9 | 1.75 | 1.6 | 1.45 | 1.3 | 1.15 | 1 | 1 |
| Hang Seng Enterprise Index Futures | Equity Index | 9.4 | 8.8 | 8.2 | 7.6 | 7 | 6.4 | 5.8 | 5.2 | 4.6 | 4 | 4 |
| Hang Seng Index Futures | Equity Index | 4.7 | 4.4 | 4.1 | 3.8 | 3.5 | 3.2 | 2.9 | 2.6 | 2.3 | 2 | 2 |
| IBEX 35 Index Futures | Equity Index | 14.1 | 13.2 | 12.3 | 11.4 | 10.5 | 9.6 | 8.7 | 7.8 | 6.9 | 6 | 6 |
| MSCI Taiwan Stock Index Futures | Equity Index | 21.15 | 19.8 | 18.45 | 17.1 | 15.75 | 14.4 | 13.05 | 11.7 | 10.35 | 9 | 9 |
| Nikkei 225 (OSE) Index Futures | Equity Index | 30.55 | 28.6 | 26.65 | 24.7 | 22.75 | 20.8 | 18.85 | 16.9 | 14.95 | 13 | 13 |
| OMXS30 Index Futures | Equity Index | 18.8 | 17.6 | 16.4 | 15.2 | 14 | 12.8 | 11.6 | 10.4 | 9.2 | 8 | 8 |
| E-mini Russell 200 Index Futures | Equity Index | 7.05 | 6.6 | 6.15 | 5.7 | 5.25 | 4.8 | 4.35 | 3.9 | 3.45 | 3 | 3 |
| S&P TSX 60 Index Futures | Equity Index | 11.75 | 11 | 10.25 | 9.5 | 8.75 | 8 | 7.25 | 6.5 | 5.75 | 5 | 5 |
| ASX SPI 200 Index Futures | Equity Index | 7.05 | 6.6 | 6.15 | 5.7 | 5.25 | 4.8 | 4.35 | 3.9 | 3.45 | 3 | 3 |
| TOPIX Index Futures | Equity Index | 2.35 | 2.2 | 2.05 | 1.9 | 1.75 | 1.6 | 1.45 | 1.3 | 1.15 | 1 | 1 |
| Australian Dollar Futures | Currency Index | 4.7 | 4.4 | 4.1 | 3.8 | 3.5 | 3.2 | 2.9 | 2.6 | 2.3 | 2 | 2 |
| British Pounds Sterling Futures | Currency Index | 4.7 | 4.4 | 4.1 | 3.8 | 3.5 | 3.2 | 2.9 | 2.6 | 2.3 | 2 | 2 |
| Canadian Dollar Futures | Currency Index | 3.525 | 3.3 | 3.075 | 2.85 | 2.625 | 2.4 | 2.175 | 1.95 | 1.725 | 1.5 | 1.5 |
| Euro Futures | Currency Index | 2.35 | 2.2 | 2.05 | 1.9 | 1.75 | 1.6 | 1.45 | 1.3 | 1.15 | 1 | 1 |
| Japanese Yen Futures | Currency Index | 2.35 | 2.2 | 2.05 | 1.9 | 1.75 | 1.6 | 1.45 | 1.3 | 1.15 | 1 | 1 |
| Swiss Franc Futures | Currency Index | 2.35 | 2.2 | 2.05 | 1.9 | 1.75 | 1.6 | 1.45 | 1.3 | 1.15 | 1 | 1 |

*The Composite Index contains all of the above contracts.
**The RBOB gasoline contract is proxied by the NY Unleaded gasoline (HUA Comdty) prior to September 2006.

TABLE B.4

Transaction commission cost assumptions used in the calculation of the StableRisk Indices, valued in US dollars, per contract, by historical year of the index. Values for years after 2010 will be determined by the Index Committee.
Transaction Commission Costs in Dollars, by Contract, by Year

| Contract Name | Index* | 2000 | 2001 | 2002 | 2003 | 2004 | 2005 | 2006 | 2007 | 2008 | 2009 | 2010 |
|---|---|---|---|---|---|---|---|---|---|---|---|---|
| 10-Year Commonwealth Treasury Bond Futures | Interest Rates Index | 11.54 | 10.80 | 10.07 | 9.33 | 8.59 | 7.86 | 7.12 | 6.38 | 5.65 | 4.91 | 4.91 |
| 2-Year US Treasury Note Futures | Interest Rates Index | 4.70 | 4.40 | 4.10 | 3.80 | 3.50 | 3.20 | 2.90 | 2.60 | 2.30 | 2.00 | 2.00 |
| 3-Month (Short) Sterling Interest Rate Futures | Interest Rates Index | 4.70 | 4.40 | 4.10 | 3.80 | 3.50 | 3.20 | 2.90 | 2.60 | 2.30 | 2.00 | 2.00 |
| 3-Month Euro Euribor Interest Rate Futures | Interest Rates Index | 6.53 | 6.12 | 5.70 | 5.28 | 4.87 | 4.45 | 4.03 | 3.61 | 3.20 | 2.78 | 2.78 |
| 3-Month Euro Swiss Franc Interest Rate Futures | Interest Rates Index | 6.53 | 6.12 | 5.70 | 5.28 | 4.87 | 4.45 | 4.03 | 3.61 | 3.20 | 2.78 | 2.78 |
| 3-Month Euroyen Futures | Interest Rates Index | 6.53 | 6.12 | 5.70 | 5.28 | 4.87 | 4.45 | 4.03 | 3.61 | 3.20 | 2.78 | 2.78 |
| 3-Year Commonwealth Treasury Bond Futures | Interest Rates Index | 11.54 | 10.80 | 10.07 | 9.33 | 8.59 | 7.86 | 7.12 | 6.38 | 5.65 | 4.91 | 4.91 |
| 30-Day Federal Fund Rate Futures | Interest Rates Index | 6.53 | 6.12 | 5.70 | 5.28 | 4.87 | 4.45 | 4.03 | 3.61 | 3.20 | 2.78 | 2.78 |
| 30-Day ASX Interbank Cash Rate Futures | Interest Rates Index | 6.53 | 6.12 | 5.70 | 5.28 | 4.87 | 4.45 | 4.03 | 3.61 | 3.20 | 2.78 | 2.78 |
| 90-Day EuroDollar Time Deposit Futures | Interest Rates Index | 4.70 | 4.40 | 4.10 | 3.80 | 3.50 | 3.20 | 2.90 | 2.60 | 2.30 | 2.00 | 2.00 |
| ASX 90-Day Bank Accepted Bills Futures | Interest Rates Index | 4.70 | 4.40 | 4.10 | 3.80 | 3.50 | 3.20 | 2.90 | 2.60 | 2.30 | 2.00 | 2.00 |
| 5-Year US Treasury Note Futures | Interest Rates Index | 4.70 | 4.40 | 4.10 | 3.80 | 3.50 | 3.20 | 2.90 | 2.60 | 2.30 | 2.00 | 2.00 |

TABLE B.4-continued

Transaction commission cost assumptions used in the calculation of the StableRisk Indices, valued in US dollars, per contract, by historical year of the index. Values for years after 2010 will be determined by the Index Committee.
Transaction Commission Costs in Dollars, by Contract, by Year

| Contract Name | Index* | 2000 | 2001 | 2002 | 2003 | 2004 | 2005 | 2006 | 2007 | 2008 | 2009 | 2010 |
|---|---|---|---|---|---|---|---|---|---|---|---|---|
| Canadian 10 Year Bond Futures | Interest Rates Index | 6.65 | 6.23 | 5.80 | 5.38 | 4.95 | 4.53 | 4.10 | 3.68 | 3.25 | 2.83 | 2.83 |
| Canadian 3-Month Bankers Acceptance Futures | Interest Rates Index | 6.53 | 6.12 | 5.70 | 5.28 | 4.87 | 4.45 | 4.03 | 3.61 | 3.20 | 2.78 | 2.78 |
| Euro-Bobl Bond Futures | Interest Rates Index | 6.53 | 6.12 | 5.70 | 5.28 | 4.87 | 4.45 | 4.03 | 3.61 | 3.20 | 2.78 | 2.78 |
| Euro-Bund Bond Futures | Interest Rates Index | 6.53 | 6.12 | 5.70 | 5.28 | 4.87 | 4.45 | 4.03 | 3.61 | 3.20 | 2.78 | 2.78 |
| Euro-Schatz Bond Futures | Interest Rates Index | 6.53 | 6.12 | 5.70 | 5.28 | 4.87 | 4.45 | 4.03 | 3.61 | 3.20 | 2.78 | 2.78 |
| Japanese 10-Year Bond Futures (JGB) | Interest Rates Index | 26.56 | 24.86 | 23.17 | 21.47 | 19.78 | 18.08 | 16.39 | 14.6 | 13.00 | 11.30 | 11.30 |
| Long Gilt Futures | Interest Rates Index | 6.37 | 5.96 | 5.56 | 5.15 | 4.74 | 4.34 | 3.93 | 3.52 | 3.12 | 2.71 | 2.71 |
| New Zealand 90-Day Bank Bill Futures | Interest Rates Index | 6.53 | 6.12 | 5.70 | 5.28 | 4.87 | 4.45 | 4.03 | 3.61 | 3.20 | 2.78 | 2.78 |
| US 10-Year Treasury Note Futures | Interest Rates Index | 4.70 | 4.40 | 4.10 | 3.80 | 3.50 | 3.20 | 2.90 | 2.60 | 2.30 | 2.00 | 2.00 |
| US 30-Year Long Bond Futures | Interest Rates Index | 4.70 | 4.40 | 4.10 | 3.80 | 3.50 | 3.20 | 2.90 | 2.60 | 2.30 | 2.00 | 2.00 |
| Brent Crude Oil Futures | Commodity Index | 10.46 | 9.79 | 9.12 | 8.46 | 7.79 | 7.12 | 6.45 | 5.79 | 5.12 | 4.45 | 4.45 |
| Coffee 'C' Futures | Commodity Index | 14.22 | 13.31 | 12.40 | 11.50 | 10.59 | 9.68 | 8.77 | 7.87 | 6.96 | 6.05 | 6.05 |
| Copper Futures | Commodity Index | 5.29 | 4.95 | 4.61 | 4.28 | 3.94 | 3.60 | 3.26 | 2.93 | 2.59 | 2.25 | 2.25 |
| Corn Futures | Commodity Index | 9.75 | 9.13 | 8.51 | 7.89 | 7.26 | 6.64 | 6.02 | 5.40 | 4.77 | 4.15 | 4.15 |
| Gasoil (IPE) Futures | Commodity Index | 10.46 | 9.79 | 9.12 | 8.46 | 7.79 | 7.12 | 6.45 | 5.79 | 5.12 | 4.45 | 4.45 |
| Gasoline RBOB Futures** | Commodity Index | 11.40 | 10.67 | 9.94 | 9.22 | 8.49 | 7.76 | 7.03 | 6.31 | 5.58 | 4.85 | 4.85 |
| Gold 100 Oz Futures | Commodity Index | 9.05 | 8.47 | 7.89 | 7.32 | 6.74 | 6.16 | 5.58 | 5.01 | 4.43 | 3.85 | 3.85 |
| Heating Oil Futures | Commodity Index | 11.40 | 10.67 | 9.94 | 9.22 | 8.49 | 7.76 | 7.03 | 6.31 | 5.58 | 4.85 | 4.85 |
| Live Cattle Futures | Commodity Index | 10.32 | 9.66 | 9.00 | 8.34 | 7.68 | 7.02 | 6.37 | 5.71 | 5.05 | 4.39 | 4.39 |
| Natural Gas Futures | Commodity Index | 11.40 | 10.67 | 9.94 | 9.22 | 8.49 | 7.76 | 7.03 | 6.31 | 5.58 | 4.85 | 4.85 |
| Primary Nickel Futures | Commodity Index | 5.29 | 4.95 | 4.61 | 4.28 | 3.94 | 3.60 | 3.26 | 2.93 | 2.59 | 2.25 | 2.25 |
| Primary Aluminum Futures | Commodity Index | 5.29 | 4.95 | 4.61 | 4.28 | 3.94 | 3.60 | 3.26 | 2.93 | 2.59 | 2.25 | 2.25 |
| Silver 5000 Oz Futures | Commodity Index | 7.05 | 6.60 | 6.15 | 5.70 | 5.25 | 4.80 | 4.35 | 3.90 | 3.45 | 3.00 | 3.00 |
| Soybean Futures | Commodity Index | 10.01 | 9.37 | 8.73 | 8.09 | 7.46 | 6.82 | 6.18 | 5.54 | 4.90 | 4.26 | 4.26 |
| Soybean Meal Futures | Commodity Index | 9.75 | 9.13 | 8.51 | 7.89 | 7.26 | 6.64 | 6.02 | 5.40 | 4.77 | 4.15 | 4.15 |
| Soybean Oil Futures | Commodity Index | 9.75 | 9.13 | 8.51 | 7.89 | 7.26 | 6.64 | 6.02 | 5.40 | 4.77 | 4.15 | 4.15 |
| Sugar #11 Futures | Commodity Index | 7.76 | 7.26 | 6.77 | 6.27 | 5.78 | 5.28 | 4.79 | 4.29 | 3.80 | 3.30 | 3.30 |
| Wheat Futures | Commodity Index | 9.75 | 9.13 | 8.51 | 7.89 | 7.26 | 6.64 | 6.02 | 5.40 | 4.77 | 4.15 | 4.15 |
| WTI Crude Oil Futures | Commodity Index | 11.40 | 10.67 | 9.94 | 9.22 | 8.49 | 7.76 | 7.03 | 6.31 | 5.58 | 4.85 | 4.85 |
| Zinc Futures | Commodity Index | 5.29 | 4.95 | 4.61 | 4.28 | 3.94 | 3.60 | 3.26 | 2.93 | 2.59 | 2.25 | 2.25 |
| Amsterdam Exchange Index Futures | Equity Index | 15.23 | 14.26 | 13.28 | 12.31 | 11.34 | 10.37 | 9.40 | 8.42 | 7.45 | 6.48 | 6.48 |
| CAC 40 10 Euro Index Futures | Equity Index | 7.26 | 6.80 | 6.33 | 5.87 | 5.41 | 4.94 | 4.48 | 4.02 | 3.55 | 3.09 | 3.09 |
| DAX Index Futures | Equity Index | 7.99 | 7.48 | 6.97 | 6.46 | 5.95 | 5.44 | 4.93 | 4.42 | 3.91 | 3.40 | 3.40 |
| E-mini Dow Jones Industrial Average Futures | Equity Index | 5.78 | 5.41 | 5.04 | 4.67 | 4.31 | 3.94 | 3.57 | 3.20 | 2.83 | 2.46 | 2.46 |
| E-mini NASDAQ 100 Index Futures | Equity Index | 6.32 | 5.92 | 5.51 | 5.11 | 4.71 | 4.30 | 3.90 | 3.50 | 3.09 | 2.69 | 2.69 |
| E-mini S&P 500 Index Futures | Equity Index | 5.29 | 4.95 | 4.61 | 4.28 | 3.94 | 3.60 | 3.26 | 2.93 | 2.59 | 2.25 | 2.25 |
| E-mini S&P Midcap 400 Futures | Equity Index | 6.32 | 5.92 | 5.51 | 5.11 | 4.71 | 4.30 | 3.90 | 3.50 | 3.09 | 2.69 | 2.69 |

TABLE B.4-continued

Transaction commission cost assumptions used in the calculation of the StableRisk Indices, valued in US dollars, per contract, by historical year of the index. Values for years after 2010 will be determined by the Index Committee.
Transaction Commission Costs in Dollars, by Contract, by Year

| Contract Name | Index* | 2000 | 2001 | 2002 | 2003 | 2004 | 2005 | 2006 | 2007 | 2008 | 2009 | 2010 |
|---|---|---|---|---|---|---|---|---|---|---|---|---|
| EURO STOXX 50 Index Futures | Equity Index | 3.64 | 3.41 | 3.18 | 2.95 | 2.71 | 2.48 | 2.25 | 2.02 | 1.78 | 1.55 | 1.55 |
| FTSE 100 Index Futures | Equity Index | 0.38 | 0.35 | 0.33 | 0.30 | 0.28 | 0.26 | 0.23 | 0.21 | 0.18 | 0.16 | 0.16 |
| FTSE JSE Top 40 Index Futures | Equity Index | 15.23 | 14.26 | 13.28 | 12.31 | 11.34 | 10.37 | 9.40 | 8.42 | 7.45 | 6.48 | 6.48 |
| FTSE MIB Index Futures | Equity Index | 15.23 | 14.26 | 13.28 | 12.31 | 11.34 | 10.37 | 9.40 | 8.42 | 7.45 | 6.48 | 6.48 |
| Hang Seng Enterprise Index Futures | Equity Index | 15.28 | 14.30 | 13.33 | 12.35 | 11.38 | 10.40 | 9.43 | 8.45 | 7.48 | 6.50 | 6.50 |
| Hang Seng Index Futures | Equity Index | 15.28 | 14.30 | 13.33 | 12.35 | 11.38 | 10.40 | 9.43 | 8.45 | 7.48 | 6.50 | 6.50 |
| IBEX 35 Index Futures | Equity Index | 11.75 | 11.00 | 10.25 | 9.50 | 8.75 | 8.00 | 7.25 | 6.50 | 5.75 | 5.00 | 5.00 |
| MSCI Taiwan Stock Index Futures | Equity Index | 5.88 | 5.50 | 5.13 | 4.75 | 4.38 | 4.00 | 3.63 | 3.25 | 2.88 | 2.50 | 2.50 |
| Nikkei 225 (OSE) Index Futures | Equity Index | 23.50 | 22.00 | 20.50 | 19.00 | 17.50 | 16.00 | 14.50 | 13.0 | 11.50 | 10.00 | 10.00 |
| OMXS30 Index Futures | Equity Index | 7.05 | 6.60 | 6.15 | 5.70 | 5.25 | 4.80 | 4.35 | 3.90 | 3.45 | 3.00 | 3.00 |
| E-mini Russell 200 Index Futures | Equity Index | 6.32 | 5.92 | 5.51 | 5.11 | 4.71 | 4.30 | 3.90 | 3.50 | 3.09 | 2.69 | 2.69 |
| S&P TSX 60 Index Futures | Equity Index | 8.60 | 8.05 | 7.50 | 6.95 | 6.41 | 5.86 | 5.31 | 4.76 | 4.21 | 3.66 | 3.66 |
| ASX SPI 200 Index Futures | Equity Index | 13.30 | 12.45 | 11.60 | 10.75 | 9.91 | 9.06 | 8.21 | 7.36 | 6.51 | 5.66 | 5.66 |
| TOPIX Index Futures | Equity Index | 31.87 | 29.83 | 27.80 | 25.76 | 23.73 | 21.70 | 19.66 | 17.6 | 15.59 | 13.56 | 13.56 |
| Australian Dollar Futures | Currency Index | 2.12 | 1.98 | 1.85 | 1.71 | 1.58 | 1.44 | 1.31 | 1.17 | 1.04 | 0.90 | 0.90 |
| British Pounds Sterling Futures | Currency Index | 3.06 | 2.86 | 2.67 | 2.47 | 2.28 | 2.08 | 1.89 | 1.69 | 1.50 | 1.30 | 1.30 |
| Canadian Dollar Futures | Currency Index | 2.35 | 2.20 | 2.05 | 1.90 | 1.75 | 1.60 | 1.45 | 1.30 | 1.15 | 1.00 | 1.00 |
| Euro Futures | Currency Index | 4.23 | 3.96 | 3.69 | 3.42 | 3.15 | 2.88 | 2.61 | 2.34 | 2.07 | 1.80 | 1.80 |
| Japanese Yen Futures | Currency Index | 3.06 | 2.86 | 2.67 | 2.47 | 2.28 | 2.08 | 1.89 | 1.69 | 1.50 | 1.30 | 1.30 |
| Swiss Franc Futures | Currency Index | 2.82 | 2.64 | 2.46 | 2.28 | 2.10 | 1.92 | 1.74 | 1.56 | 1.38 | 1.20 | 1.20 |

*The Composite Index contains all of the above contracts.
**The RBOB gasoline contract is proxied by the NY Unleaded gasoline (HUA Comdty) prior to September 2006.

The invention described above is operational with general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

Components of the inventive computer system may include, but are not limited to, a processing unit, a system memory, and a system bus that couples various system components including the system memory to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system typically includes a variety of non-transitory computer-readable media. Computer-readable media can be any available media that can be accessed by the computer and includes both volatile and nonvolatile media, and removable and non-removable media. By way of example, and not limitation, computer-readable media may comprise computer storage media and communication media. Computer storage media may store information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The computer system may operate in a networked environment using logical connections to one or more remote computers. The remote computer may be a personal computer, a server, a router, a network PC, a peer device or other common network node, and typically includes many or all of the elements described above relative to the computer. The logical connections depicted in include one or more local area networks (LAN) and one or more wide area networks (WAN), but may also include other networks. Such networking environments are commonplace in offices, enterprise-wide computer networks, intranets and the Internet.

For ease of exposition, not every step or element of the present invention is described herein as part of software or computer system, but those skilled in the art will recognize that each step or element may have a corresponding computer system or software component. Such computer systems and/or software components are therefore enabled by describing their corresponding steps or elements (that is, their functionality), and are within the scope of the present invention. In addition, various steps and/or elements of the present invention may be stored in a non-transitory storage medium, and selectively executed by a processor.

While the invention has been particularly shown and described with reference to a preferred embodiment, it will be understood by those skilled in the art that various changes in form and detail may be made therein without departing from the spirit and scope of the invention.

What is claimed is:

1. A computer implemented method for maintaining the short term risk of asset classes, within an investment portfolio, at or near the long term volatility level of said asset classes, comprising:
   storing, in a non-transitory computer readable medium, eligible future contracts based on a minimum average daily dollar trading volume and regulatory restrictions;
   calculating, by a data-processor, the volatility target level for each asset class using the average volatility for traditional long-only indexes representing each asset class for a predefined trailing period, wherein said asset classes include equity, interest rate, currency, and commodity;
   stabilizing, by said data-processor, the volatility of each asset class at said target level by modulating the market exposure of each asset class;
   rescaling the risk allocation among asset classes; and
   combining said rescaled asset classes into a composite index.

2. The computer implemented method of claim 1, wherein said predefined trailing period is 10-years.

3. The computer implemented method of claim 1, wherein said modulation of market exposure of each asset class is inversely proportional to the short term volatility for that asset class.

4. The computer implemented method of claim 1, further comprising the step of allocating risk among constituent assets within an asset class.

5. The computer implemented method of claim 4, wherein said risk is allocated equally among constituent assets within said asset class.

6. The computer implemented method of claim 1, further comprising the step of determining trading costs.

7. A system for maintaining the short term risk of asset classes, within an investment portfolio, at or near the long term volatility level of said asset classes, comprising:
   a non-transitory computer readable medium configured to store eligible future contracts based on a minimum average daily dollar trading volume and regulatory restrictions;
   a data-processor programmed to:
      calculate, by said data-processor, the volatility target level for each asset class using the average volatility for traditional long-only indexes representing each asset class for a predefined trailing period, wherein said asset classes include equity, interest rate, currency, and commodity;
      stabilize, by said data-processor, the volatility of each asset class at said target level by modulating the market exposure of each asset class;
      rescale, by said data-processor, the risk allocation among asset classes; and
      combine, by said data-processor, said rescaled asset classes into a composite index.

8. The system of claim 7, wherein said predefined trailing period is 10-years.

9. The system of claim 7, wherein said modulation of market exposure of each asset class is inversely proportional to the short term volatility for that asset class.

10. The system of claim 7, wherein said data processor is further programmed to allocate risk among constituent assets within an asset class.

11. The system of claim 10, wherein said risk is allocated equally among constituent assets within said asset class.

12. The system of claim 7, wherein said data processor is further programmed to determine trading costs.

13. A non-transitory computer-readable medium having stored thereon computer-executable instructions for maintaining the short term risk of asset classes, within an investment portfolio, at or near the long term volatility level of said asset classes, the stored computer-executable instructions configured to cause a computer to perform steps comprising:
   identifying eligible future contracts based on a minimum average daily dollar trading volume and regulatory restrictions;
   calculating the volatility target level for each asset class using the average volatility for traditional long-only indexes representing each asset class for a predefined trailing period, wherein said asset classes include equity, interest rate, currency, and commodity;
   stabilizing the volatility of each asset class at said target level by modulating the market exposure of each asset class;
   rescaling the risk allocation among asset classes; and
   combining said rescaled asset classes into a composite index.

* * * * *